US011624362B2

(12) United States Patent
Dawn

(10) Patent No.: US 11,624,362 B2
(45) Date of Patent: Apr. 11, 2023

(54) DEVICE FOR PUMPING FLUID

(71) Applicant: Magpumps Limited, Lyndhurst (GB)

(72) Inventor: Leo Dawn, Tadworth (GB)

(73) Assignee: MAGPUMPS LIMITED, Lyndhurst (GB)

( * ) Notice: Subject to any disclaimer, the term of this patent is extended or adjusted under 35 U.S.C. 154(b) by 88 days.

(21) Appl. No.: 17/132,314

(22) Filed: Dec. 23, 2020

(65) Prior Publication Data
US 2021/0215157 A1    Jul. 15, 2021

Related U.S. Application Data

(63) Continuation-in-part of application No. 15/750,974, filed as application No. PCT/EP2016/025084 on Aug. 8, 2016, now abandoned.

(30) Foreign Application Priority Data

Aug. 7, 2015  (GB) ..................................... 1514032

(51) Int. Cl.
*F04C 14/08* (2006.01)
*F04C 2/18* (2006.01)
(Continued)

(52) U.S. Cl.
CPC .............. *F04C 14/08* (2013.01); *F04C 2/00* (2013.01); *F04C 2/18* (2013.01); *F04C 14/06* (2013.01);
(Continued)

(58) Field of Classification Search
CPC ..... F04C 2/00; F04C 2/18; F04C 14/06; F04C 14/08; F04C 14/28; F04C 2220/24;
(Continued)

(56) References Cited

U.S. PATENT DOCUMENTS

| 10,018,198 B2 * | 7/2018 | Hoppach .................. F04C 2/10 |
| 2007/0098586 A1 | 5/2007 | Clark |

(Continued)

FOREIGN PATENT DOCUMENTS

| CN | 101490513 A | 7/2009 |
| CN | 103080550 A | 5/2013 |

(Continued)

OTHER PUBLICATIONS

GB Intellectual Property Office, Combined Search and Examination Report under Sections 17 & 18(3) issued in GB Application No. GB2107226.9 dated Oct. 28, 2021, 7 pages.
(Continued)

*Primary Examiner* — Charles G Freay
(74) *Attorney, Agent, or Firm* — Ziegler IP Law Group, LLC

(57) ABSTRACT

The disclosure herein relates to device, for example a gear pump, for pumping fluid. The gear pump comprises a motor for driving a rotatable drive shaft; a drive gear configured to be driven by the drive shaft; an idler gear which meshes with the drive gear; an annular magnet disposed coaxially with the drive shaft and configured to rotate therewith; and a sensor for sensing rotation of the annular magnet and generating an output signal corresponding to a rotational position of the drive shaft.

27 Claims, 11 Drawing Sheets

(51) Int. Cl.
*F04C 2/00* (2006.01)
*G05D 16/20* (2006.01)
*F04C 14/06* (2006.01)
*F04C 14/28* (2006.01)

(52) U.S. Cl.
CPC .......... *F04C 14/28* (2013.01); *F04C 2220/24* (2013.01); *F04C 2240/20* (2013.01); *F04C 2240/40* (2013.01); *F04C 2240/601* (2013.01); *F04C 2240/81* (2013.01); *F04C 2270/07* (2013.01); *F04C 2270/10* (2013.01); *F04C 2270/205* (2013.01); *G05D 16/2066* (2013.01)

(58) Field of Classification Search
CPC .............. F04C 2240/20; F04C 2240/40; F04C 2240/601; F04C 2240/81; F04V 2270/07; F04V 2270/10; F04V 2270/205; G05D 16/2066
See application file for complete search history.

(56) References Cited

U.S. PATENT DOCUMENTS

| | | | | |
|---|---|---|---|---|
| 2007/0253832 | A1* | 11/2007 | Kenney | B01L 3/0213 417/297 |
| 2008/0075608 | A1* | 3/2008 | Suzuki | F04C 14/08 417/410.1 |
| 2013/0336808 | A1* | 12/2013 | Wang | F04C 15/0057 417/374 |
| 2014/0056720 | A1* | 2/2014 | Jackie | F04B 49/065 417/18 |
| 2014/0169987 | A1 | 6/2014 | Du | |
| 2020/0256336 | A1* | 8/2020 | Terzo | F04B 53/18 |

FOREIGN PATENT DOCUMENTS

| | | |
|---|---|---|
| CN | 104564658 A | 4/2015 |
| EP | 1932555 B2 | 6/2016 |
| GB | 2204688 A | 11/1988 |
| GB | 2490115 A | 10/2012 |
| GB | 2541031 A | 2/2017 |
| JP | 2002116075 A | 4/2002 |
| WO | 2007/132062 A1 | 11/2007 |
| WO | 2014/036419 A1 | 3/2014 |

OTHER PUBLICATIONS

Intellectual Property Office, Combined Search and Examination Report under Sections 17 and 18(3), Application GB1514032.0, dated Feb. 3, 2016, 6 pages.
International Search Report and Written Opinion of the International Searching Authority, Application PCT/EP2016/025084, dated Nov. 7, 2016, 12 pages.
International Preliminary Report on Patentability and Written Opinion of the International Searching Authority, Application PCT/EP2016/025084, dated Feb. 13, 2018, 8 pages.
Intellectual Property India, First Examination, Application IN201817007362, dated May 26, 2020, 6 pages. (Dual Language).

* cited by examiner

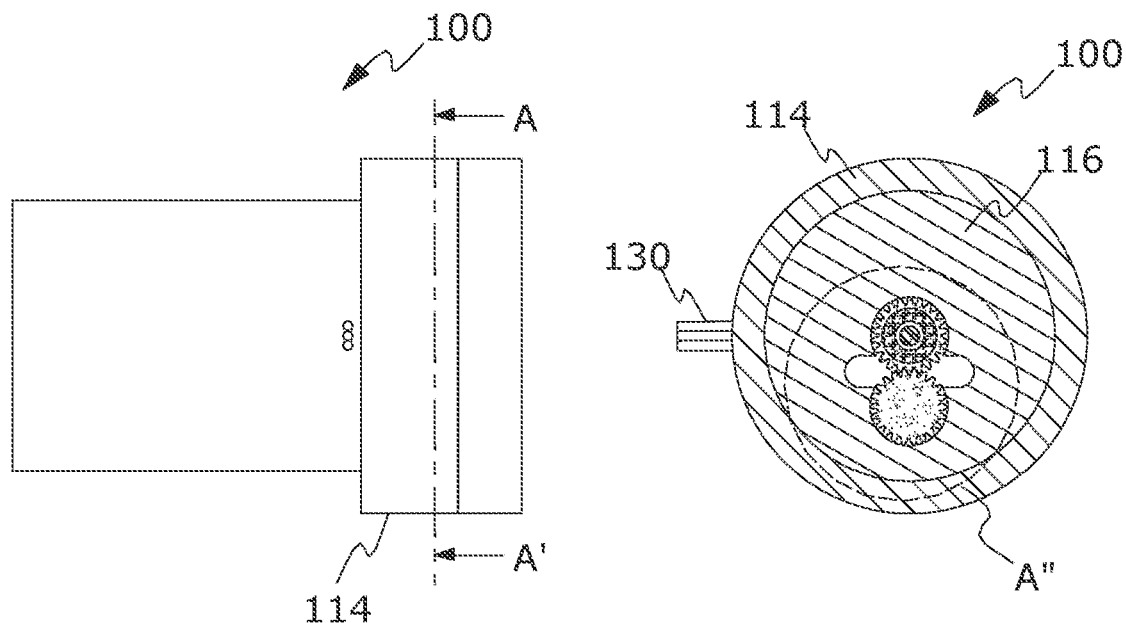
FIG. 6A
FIG. 6B
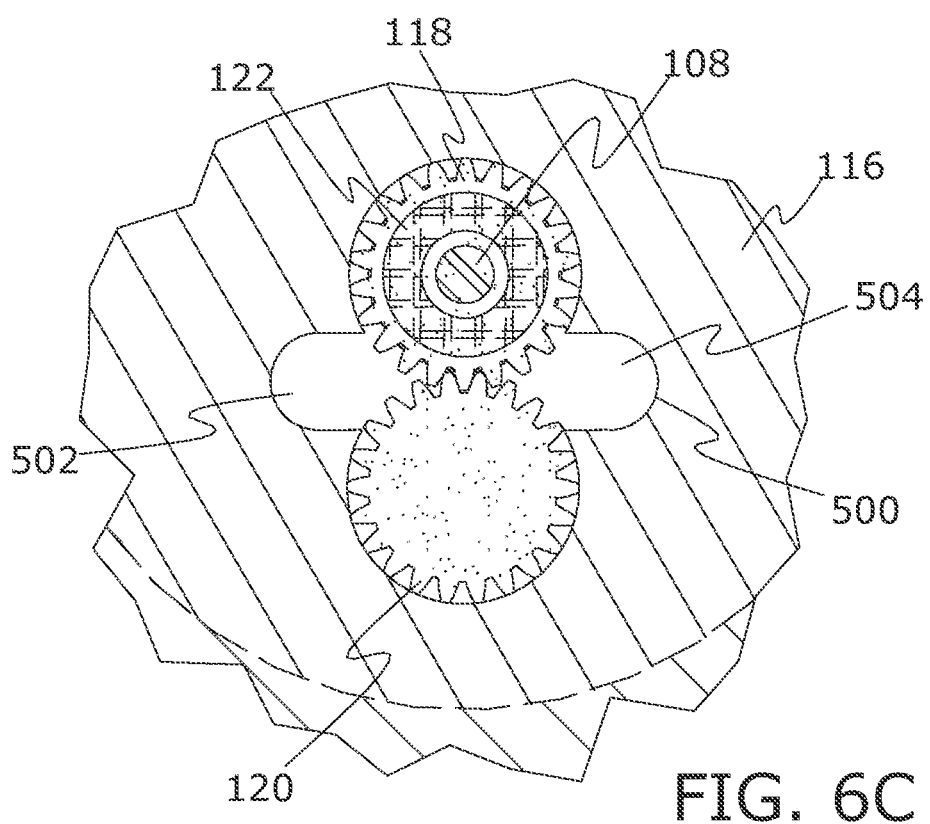
FIG. 6C

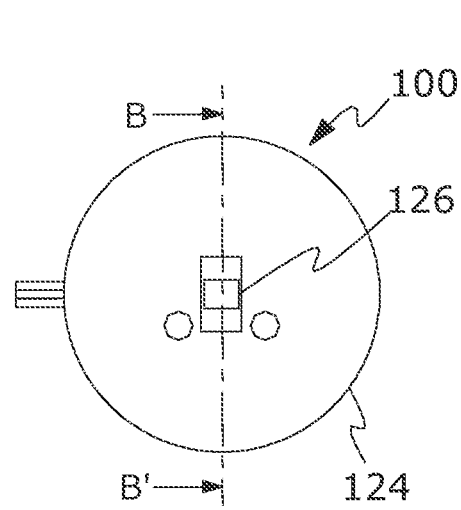
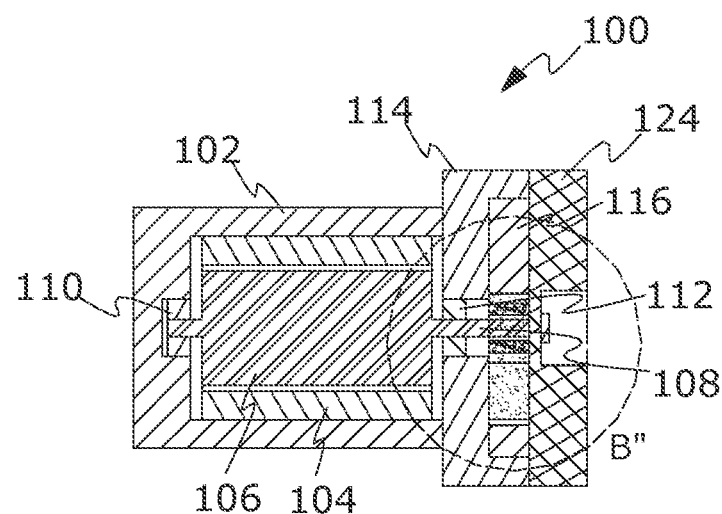
FIG. 7A  FIG. 7B
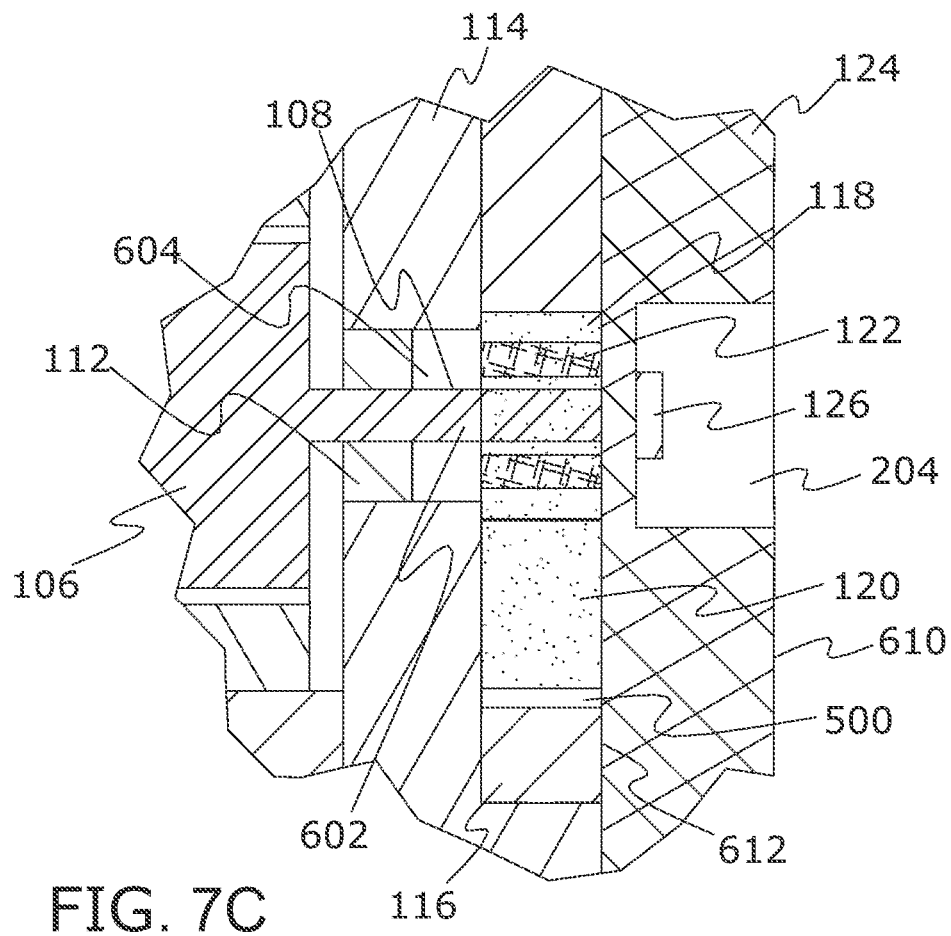
FIG. 7C gear1 = driven gear
gear2 = idler gear

DEVICE FOR PUMPING FLUID

TECHNICAL FIELD

The present disclosure relates to devices, for example to gear pumps, for pumping fluids. Moreover, the present disclosure concerns methods of using the aforesaid devices to pump fluids. Such fluids are, for example, liquids, gases, gels, emulsions, foam, powders, or any combination or mixture thereof.

BACKGROUND

Gear pumps are used in a wide variety of technical fields, for example when manufacturing automobiles, in food industries, in medicine and so forth. Typically, a known gear pump includes two gear wheels (also referred as "cog-wheels") that are operable to engage with each other, and are rotated when in operation, for example in mutually opposite directions, by a drive shaft of a motor. Moreover, the two gear wheels are arranged in a channel of a pump cylinder and are operable to create a suction pressure zone at an inlet of the channel and an ejection pressure zone at an outlet of the channel. Furthermore, the two gear wheels are constructed for allowing a positive displacement of a "substrate" for each cycle (i.e. rotation of the two gear wheels or the drive shaft) of pump operation; such a substrate is, for example, a fluid, for example a liquid or a gas. A gear pump can attain a volumetric control in terms of discharge of the substrate therefrom by monitoring and controlling a rotational position of the drive shaft of the motor.

Contemporarily, for achieving such volumetric control, an optical encoder is used in conjunction with a gear pump. For example, the optical encoder is operatively coupled to a drive shaft of a motor of the gear pump for measuring a rotational position of the drive shaft, based upon which a specific volume of the substrate, for example a fluid, for example a liquid or gas, is discharged from the gear pump. Moreover, for the optical encoder to operate efficiently and accurately to measure the rotational position of the drive shaft, the optical encoder must be isolated or separated from the substrate, for example a fluid, for example a liquid or gas. Generally, for isolating the optical encoder from the substrate, for example fluid, for example liquid, a mechanical sealing arrangement, or a magnetic torque coupler, is used such that the optical encoder is surrounded with air to function efficiently and accurately. However, the use of such a mechanical sealing arrangement increases an overall complexity and cost of manufacturing for such gear pumps. Moreover, gear pumps which do not incorporate such a sealing arrangement, or where the sealing arrangement is breached, cannot be used for pumping accurate volumes of the substrate, for example a fluid, for example a liquid or a gas, because the rotation of the drive shaft cannot be accurately measured in such a situation using the optical encoder.

Therefore, it will be appreciated from the foregoing that known types of gear pumps, for example when pumping fluids, for example liquids or gases, suffer various problems that can adversely influence their pumping accuracy.

SUMMARY

The present disclosure seeks to provide an improved device for pumping a fluid, for example a liquid or gas.

The present disclosure also seeks to provide an improved gear pump for pumping a fluid, for example a liquid or a gas, wherein gears of the improved pump are monitored and controlled in operation improved resolution, for example to sub-tooth angular resolution.

The present disclosure also seeks to provide an improved gear pump for pumping a fluid, for example a liquid or a gas, wherein applied torque to gears of the gear pump is more accurately controlled to achieve an improved transient dynamic performance for the gear pump when in operation.

The present disclosure also seeks to provide an improved method for (namely, a method of) operating a gear pump for pumping fluid, for example a liquid or a gas.

According to a first aspect, there is provided a gear pump for pumping fluid, wherein the gear pump comprises:
 a motor for driving a rotatable drive shaft;
 a drive gear that is operable to be driven by the drive shaft;
 an idler gear which meshes with the drive gear;
 an annular magnet arrangement disposed coaxially with the drive shaft and operable to rotate therewith;
 a sensor for sensing rotation of the annular magnet arrangement and generating an output signal corresponding to a rotational position of the drive shaft; and
 a controller that is operable to calculate the rotational position of the drive shaft based upon the output signal and to control the motor based upon the calculated rotational position to ensure that a controlled volume of fluid is pumped, wherein the controller is configured to use at least one PID algorithm to control the motor.

The present invention is capable of substantially eliminating the aforementioned problems in the prior art, and is capable of enabling pumping of a controlled volume of fluid more accurately by using PID control algorithms, wherein the fluid is for example a liquid or gas, in combination with a gear motor without being subjected to increased complexity and cost of manufacturing.

Optionally, in the gear pump, the controller is operable to use nested feedback loops to adjust an electrical current or an electrical excitation voltage applied to the motor to ensure that a controlled volume of the fluid is pumped. More optionally, in the gear pump, the nested feedback loops include an outer loop that is provided with an input signal that is representative of a rotation angle or a rotation rate of the rotatable drive shaft or at least one of the drive gear and the idler gear.

Optionally, in operation of the gear pump, the controller is configured to adaptively adjust coefficients of the at least one PID algorithm in response to operating conditions of the gear pump.

Optionally, in the gear pump, the sensor comprises a Hall Effect array that is operable to generate the output signal in a form of a Hall Effect voltage in response to the rotation of the annular magnet arrangement.

Optionally, in the gear pump, the annular magnet arrangement is disposed within the drive gear.

Optionally, in the gear pump, the annular magnet arrangement is magnetised diametrically.

Optionally, the gear pump includes a pump housing having an exterior surface.

More optionally, in the gear pump, the sensor is disposed on or proximal to the exterior surface of the pump housing.

More optionally, in the gear pump, the sensor is disposed on or proximal to an inside region within the exterior surface of the pump housing.

More optionally, in the gear pump, the exterior surface of the pump housing comprises a pump face.

More optionally, in the gear pump, the pump face comprises a trench and wherein the sensor is disposed at least partially within the trench.

More optionally, in the gear pump, the trench is positioned in the pump face such that the sensor is disposed coaxially with the annular magnet arrangement.

More optionally, in the gear pump, the pump face defines a fluid inlet port and a fluid outlet port.

According to a second aspect, there is provided a method of pumping a fluid using a gear pump, wherein the method comprises steps of:

driving a motor to rotate a drive shaft, and arranging for the drive shaft to rotate one or more rotatable components of a pump module for pumping the fluid, and for rotating a sensor target associated with the drive shaft and/or the one or more rotatable components of the pump module;

using a sensor to sense rotation of sensor target and to generate an output signal corresponding to an annular position of the sensor target;

calculating the rotational position or a rotation rate of the drive shaft and/or the one or more the one or more rotatable components of the pump module based upon the output signal; and controlling the motor based upon the calculated rotational position or rotation rate to controllably pump a volume of the fluid, wherein the controlling uses at least one PID algorithm to control the motor.

Optionally, the method includes configuring the controller to use nested feedback loops to adjust an electrical current or an electrical excitation voltage applied to the motor to ensure that a controlled volume of the fluid is pumped. More optionally, the method includes configuring the nested feedback loops to include an outer loop that is provided with an input signal that is representative of a rotation angle or a rotation rate of the rotatable drive shaft or at least one of the one or more rotatable pumping components of the gear pump.

Optionally, the method includes configuring the controller to adaptively adjust coefficients of the at least one PID algorithm in response to operating conditions of the gear pump.

Optionally, the method includes arranging for the sensor target to include an annular magnet arrangement.

According to a third aspect, there is provided a software product including computing instructions therein that are executable by computing hardware to implement the method of the second aspect.

According to a fourth aspect, there is provided a device for pumping a fluid, wherein the device comprises:

a motor for driving a rotatable drive shaft;

a pump module to be driven in operation by the drive shaft;

at least one sensor target operatively associated with at least one of: the drive shaft, one or more rotatable pumping components of the pump module;

at least one sensor for sensing a change in property of the a least one sensor target as the drive shaft rotates in operation, and for generating an output signal corresponding to a rotational position of at least one of: the drive shaft, the one or more rotatable pumping components of the pump module; and a controller that is operable to calculate the rotational position or a rotation rate of at least one of: the drive shaft, the one or more rotatable pumping components of the pump module, based upon the output signal and to control the motor (20) based upon the calculated rotational position or the rotation rate to ensure that a controlled volume of the fluid is pumped, wherein the controller is configured to use at least one PID algorithm to control the motor.

Optionally, in operation of the device, the controller is operable to use nested feedback loops to adjust an electrical current or an electrical excitation voltage applied to the motor to ensure that a controlled volume of the fluid is pumped.

More optionally, in operation of the device, the nested feedback loops include an outer loop that is provided with an input signal that is representative of a rotation angle or a rotation rate of the rotatable drive shaft or at least one of the one or more rotatable pumping components of the pump module.

Optionally, in operation of the device, the controller is configured to adaptively adjust coefficients of the at least one PID algorithm in response to operating conditions of the device. For example, when the device is pumping fluid at a higher rate, its component parts will be rotating faster resulting in reduced transport delay for fluid through the device; conversely, when the device is pumping at a lower rate, its component parts will be rotating slower resulting in increased transport delay for fluid through the device; differential coefficients for the at least one PID algorithm need to be relatively smaller for the higher rate, and relatively larger for the lower rate to ensure that the device functions well for both the higher rate and the lower rate in an adaptive manner.

Optionally, in operation of the device, the at least one sensor is operable to measure an angular position of the drive shaft for generating the output signal, and the controller is operable to calculate the rotational position of the drive shaft for use in controlling the motor to ensure that a controlled volume of fluid is pumped.

Optionally, in operation of the device, the at least one sensor is operable to measure an angular position of a driven rotating pumping component of the pump module for generating the output signal, and the controller is operable to calculate the calculated rotational position of the driven rotating pump component for use in controlling the motor to ensure that a controlled volume of fluid is pumped. Measuring the angular position of the driven component is capable of improving pump accuracy.

Optionally, in operation of the device, the at least one sensor is operable to measure an angular position of an idling rotating pumping component of the pump module for generating the output signal, and the controller is operable to calculate the calculated rotational position of the idling rotating pumping component for use in controlling the motor to ensure that a controlled volume of fluid is pumped.

Optionally, in operation of the device, the at least one sensor target comprises a disc that has alternate optically transparent and opaque patterns and a light source, and the at least one sensor is a photodetector array that is operable to receive light from the optically transparent and opaque patterns to generate the output signal for use in controlling the motor to ensure that a controlled volume of fluid is pumped.

Optionally, in operation of the device, the at least one sensor target comprises a material whose dielectric and/or conductive properties spatially varies, and the at least one sensor includes a pair of electrodes that are operable to interact capacitively with the at least one sensor target to generate an output signal in response to the rotation of the drive shaft causing a capacitance generated between the pair of electrodes to change.

Optionally, in operation of the device, the at least one sensor target is fabricated from a material whose magnetic properties are spatially varying, and the at least one sensor is operable such that its inductance changes as a function of angular position of the at least one sensor target relative to the at least one sensor, wherein the at least one sensor is operable to generate the output signal in response to the rotation of the drive shaft.

More optionally, in operation of the device, the at least one sensor target comprises a disc having circumferential teeth, and the at least one sensor comprises a magnet and a surrounding coil assembly configured to generate the output signal in a form of magnetic flux as the change in the property in response to the rotation of the drive shaft.

Optionally, in operation of the device, the at least one sensor target and the at least one sensor are included within a pump housing of the device.

Optionally, in operation of the device, the at least one sensor target is included within a pump housing of the device and the at least one sensor is exterior to that housing.

Optionally, in operation of the device, the at least one sensor target and the at least one sensor are exterior to a pump housing of the device.

Optionally, in operation of the device, the controller includes a plurality of servo loops coupled to the sensor for controlling the motor, wherein the plurality of servo loops are of mutually different response bandwidth and of mutually different gains.

More optionally, in operation of the device, at least one of the servo loops is operable to monitor an angular position of the drive shaft, and at least one of the servo loops is operable to monitor an angular position of at least one of the one or more rotatable pump components.

Optionally, in operation of the device, the device further comprises a pump housing, having an exterior surface, for accommodating the pump module therein.

More optionally, in the device, the at least one sensor is disposed on or proximal to the exterior surface of the pump housing.

More optionally, in the device, the exterior surface of the pump housing comprises a pump face.

More optionally, in the device, the pump face defines a fluid inlet port and a fluid outlet port.

Optionally, in the device, the pump module is one of a rotary pump or a reciprocating pump.

Optionally, in device, the controller is operable to employ a nested position feedback loop. Optionally, the nested position feedback loop uses a PID control algorithm.

Additional aspects, advantages, features and objects of the present disclosure would be made apparent from the drawings and the detailed description of the illustrative preferred embodiments construed in conjunction with the appended claims that follow.

BRIEF DESCRIPTION OF THE DRAWINGS

The summary above, as well as the detailed description of the disclosure, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 6A-C are the assembled plan view of the gear pump, a cross-sectional view of the assembled plan view about an axis A-A', and an enlarged view of a portion A" of the cross-sectional view, respectively, in accordance with an embodiment of the present disclosure;

FIGS. 7A-C are the assembled elevation view of the gear pump, a cross-sectional view of the assembled elevation view about an axis B-B', and an enlarged view of a portion B" of the cross-sectional view, respectively, in accordance with an embodiment of the present disclosure;

Figure 1:
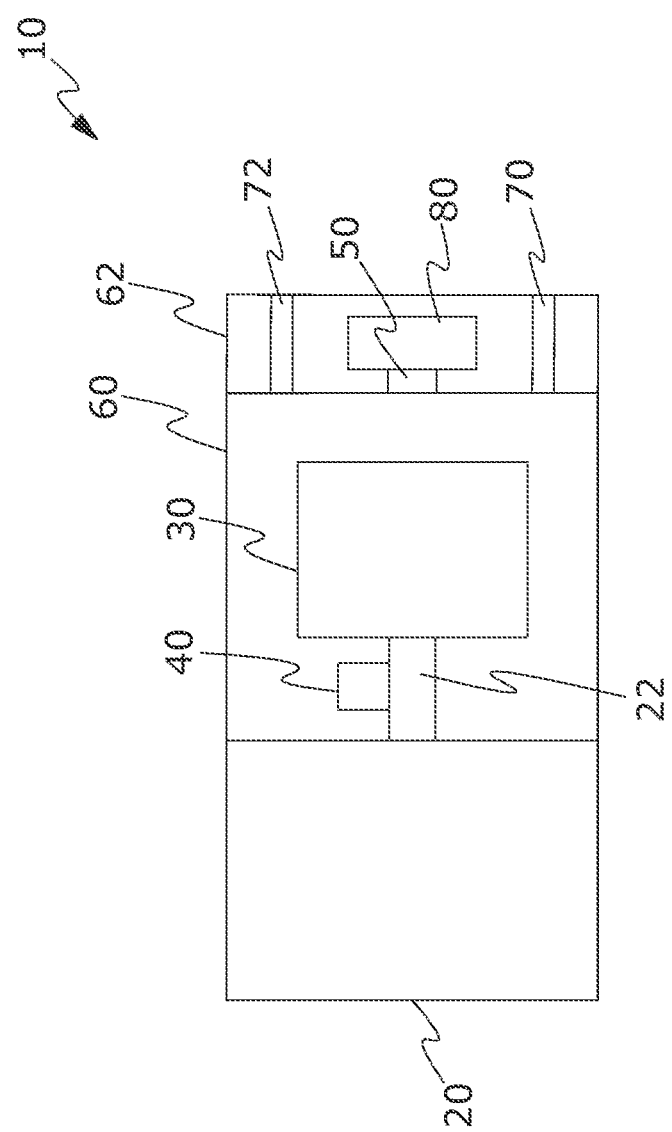
FIG. 1 is a schematic view of a device for pumping fluid, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

The present disclosure will now be described in more detail by reference to preferred particular embodiments.

DETAILED DESCRIPTION OF THE DISCLOSURE

Embodiments of the disclosure will now be described in more detail with reference to component parts of a device for pumping a fluid, for example a liquid. The embodiments concern a gear pump, and a method of operating such a gear pump.

According to an aspect, there is provided a gear pump for pumping fluid, wherein the gear pump comprises:
  a motor for driving a rotatable drive shaft;
  a drive gear that is operable to be driven by the drive shaft;
  an idler gear which meshes with the drive gear;
  an annular magnet arrangement disposed coaxially with the drive shaft (108) and operable to rotate therewith;
  a sensor for sensing rotation of the annular magnet arrangement and generating an output signal corresponding to a rotational position of the drive shaft; and
  a controller that is operable to calculate the rotational position of the drive shaft based upon the output signal and to control the motor based upon the calculated rotational position to ensure that a controlled volume of fluid is pumped, wherein the controller is configured to use at least one PID algorithm to control the motor.

Optionally, in the gear pump, the sensor comprises a Hall Effect array that is operable to generate the output signal in a form of a Hall Effect voltage in response to the rotation of the annular magnet arrangement.

Optionally, in the gear pump, the annular magnet arrangement is disposed within the drive gear.

Optionally, in the gear pump, the annular magnet arrangement is magnetised diametrically.

Optionally, the gear pump includes a pump housing having an exterior surface.

More optionally, in the gear pump, the sensor is disposed on or proximal to the exterior surface of the pump housing.

More optionally, in the gear pump, the sensor is disposed on or proximal to an inside region within the exterior surface of the pump housing.

More optionally, in the gear pump, the exterior surface of the pump housing comprises a pump face.

More optionally, in the gear pump, the pump face comprises a trench and wherein the sensor is disposed at least partially within the trench.

More optionally, in the gear pump, the trench is positioned in the pump face such that the sensor is disposed coaxially with the annular magnet arrangement.

More optionally, in the gear pump, the pump face defines a fluid inlet port and a fluid outlet port.

According to an aspect, there is provided a method for (namely, a method of) pumping fluid using a gear pump, wherein the method comprises steps of:
  driving a motor to rotate a drive shaft, and arranging for the drive shaft to rotate one or more rotatable components of a pump module for pumping fluid, and for rotating a sensor target associated with the drive shaft and/or the one or more rotatable components of the pump module;
  using a sensor to sense rotation of at least one sensor target and to generate an output signal corresponding to an annular position of the at least one sensor target;
  calculating the rotational position of the drive shaft and/or the one or more the one or more rotatable components of the pump module based upon the output signal; and
  controlling the motor based upon the calculated rotational position to controllably pump a volume of fluid, wherein the controlling uses at least one PID algorithm to control the motor.

Optionally, the method includes arranging for the at least one sensor target to include an annular magnet arrangement, for example an annular magnet.

According to an aspect, there is provided a device for pumping a fluid, wherein the device comprises:
  a motor for driving a rotatable drive shaft;
  a pump module to be driven in operation by the drive shaft;
  at least one sensor target, for example a plurality of sensor targets, operatively associated with at least one of: the drive shaft, one or more rotatable pumping components of the pump module, or the fluid itself;
  a sensor for sensing a change in property of the at least one sensor target as the drive shaft rotates in operation, and for generating an output signal corresponding to a rotational position of at least one of: the drive shaft, the one or more rotatable pumping components of the pump module; and
  a controller that is operable to calculate the rotational position or a rotation rate of at least one of: the drive shaft, the one or more rotatable pumping components of the pump module, based upon the output signal and to control the motor based upon the calculated rotational position to ensure that a controlled volume of fluid is pumped, wherein the controller is configured to use at least one PID algorithm to control the motor.

Optionally, in operation of the device, the controller is operable to use nested feedback loops to adjust an electrical current or an excitation voltage applied to the motor to ensure that a controlled volume of fluid is pumped. More optionally, in operation of the device, the nested feedback loops include an outer loop that is provided with an input signal that is representative of a rotation rate of the drive shaft, and an inner loop that is provided with an input signal that is representative of a rotation rate of at least one of the one or more rotatable pumping components of the pump module.

Optionally, in operation of the device, the sensor is operable to measure an angular position of the drive shaft for generating the output signal, and the controller is operable to calculate the rotational position of the drive shaft for use in controlling the motor to ensure that a controlled volume of fluid is pumped.

Optionally, in operation of the device, the sensor is operable to measure an angular position of a driven rotating pumping component of the pump module for generating the output signal, and the controller is operable to calculate the calculated rotational position of the driven rotating pump component for use in controlling the motor to ensure that a controlled volume of fluid is pumped. Measuring the angular position of the driven component is capable of improving pump accuracy.

Optionally, in operation of the device, the sensor is operable to measure an angular position of an idling rotating pumping component of the pump module for generating the output signal, and the controller is operable to calculate the calculated rotational position of the idling rotating pumping component for use in controlling the motor to ensure that a controlled volume of fluid is pumped.

Optionally, in operation of the device, the at least one sensor target comprises a disc that has alternate optically transparent and opaque patterns and a light source, and the sensor is a photodetector array that is operable to receive light from the optically transparent and opaque patterns to generate the output signal for use in controlling the motor to ensure that a controlled volume of fluid is pumped.

Optionally, in operation of the device, the at least one sensor target comprises a material whose dielectric and/or conductive properties spatially varies, and the sensor includes a pair of electrodes that are operable to interact capacitively with the at least one sensor target to generate an output signal in response to the rotation of the drive shaft causing a capacitance generated between the pair of electrodes to change.

Optionally, in operation of the device, the at least one sensor target is fabricated from a material whose magnetic properties are spatially varying, and the sensor is operable such that its inductance changes as a function of angular position of the at least one sensor target relative to the sensor, wherein the sensor is operable to generate the output signal in response to the rotation of the drive shaft.

More optionally, in operation of the device, the at least one sensor target comprises a disc having circumferential teeth, and the sensor comprises a magnet and a surrounding coil assembly configured to generate the output signal in a form of magnetic flux as the change in the property in response to the rotation of the drive shaft.

Optionally, in operation of the device, the at least one sensor target and the sensor are included within a pump housing of the device.

Optionally, in operation of the device, the at least one sensor target and the sensor are exterior to a pump housing of the device.

Optionally, in operation of the device, the controller includes a plurality of servo loops coupled to the sensor for controlling the motor, wherein the plurality of servo loops are of mutually different response bandwidth and of mutually different gains.

More optionally, in operation of the device, at least one of the servo loops is operable to monitor an angular position of the drive shaft, and at least one of the servo loops is operable to monitor an angular position of at least one of the one or more rotatable pump components.

Optionally, in operation of the device, the device further comprises a pump housing, having an exterior surface, for accommodating the pump module therein.

More optionally, in the device, the sensor is disposed on or proximal to the exterior surface of the pump housing.

More optionally, in the device, the exterior surface of the pump housing comprises a pump face.

More optionally, in the device, the pump face defines a fluid inlet port and a fluid outlet port.

Optionally, in the device, the pump module is one of a rotary pump or a reciprocating pump.

Optionally, in device, the controller is operable to employ a nested position feedback loop.

In respect of embodiments of the present disclosure, component parts of the embodiments will next be described in greater detail.

Pump Module

A pump module pursuant to the present disclosure includes a positive displacement pump, wherein the pump module is operable to pump a given volume of a substrate, for example a fluid, for example a liquid or a gas, in each cycle, or partial cycle, of its operation. Typically, the positive displacement pump functions by trapping a constant volume of substrate, for example a fluid, for example a liquid or gas, under conditions of constant pressure developed between a fluid inlet port to a fluid outlet port of the pump; the positive displacement pump is thus operable to pull in, for example by viscous drag, the constant volume of substrate, for example fluid, for example liquid or gas, through the fluid inlet port of the pump and pushing out, namely pumping or dispensing, that constant volume of substrate, for example fluid, for example liquid or gas, through the fluid outlet port of the pump; however, it will be appreciated that, in a practical embodiment, the pressure developed between a fluid inlet port to a fluid outlet port of the pump will often vary as a function of time. The pump module optionally includes an expanding cavity near the fluid inlet port to pull the substrate, for example fluid, for example liquid or gas, into the pump and a decreasing cavity near the fluid outlet port, so as the decreasing cavity collapses, namely momentarily reduces in size in operation, the substrate, for example a fluid, for example a liquid or gas, is pumped out via the fluid outlet port. The positive displacement pump is implemented as a rotary type of pump or a reciprocating type of pump.

Rotary Pump

A rotary pump displaces a constant volume of substrate for each revolution, or partial revolution of a drive shaft of the rotary pump. A rotary pump optionally includes pump modules such as gears, screws, vanes and so forth. Accordingly, the rotary pump is optionally a gear pump, a screw pump, a vane pump, and so forth.

Gear Pump

A gear pump includes components such as a motor and a gear arrangement for pumping or dispensing a substrate, for example a fluid, for example a liquid or gas, therethrough. Moreover, the gear pump is operable to provide a consistent output for a certain pressure range, namely pressure difference developed in operation between an inlet port and an outlet port of the gear pump, and an operating speed of the gear arrangement of the pump. It is assumed, for the gear pump, that there is employed precise and close fittings and connections between the gear arrangement and a housing of the pump. The gear pump optionally, further includes an external gear arrangement or an internal gear arrangement. In an example embodiment of the present disclosure, the gear pump is further provided with a control arrangement for providing volumetric control of fluid that is pumped in operation through the gear pump; namely, the gear pump is operable to pump a controlled volume of fluid by way of using a measurement of a rotational position of a drive shaft of the gear pump. A desired rotational position of the drive shaft is monitored and controlled by providing a required amount of electrical power to the motor; obtaining such a desired rotational position will be explained in greater detail below.

It will be appreciated that a high manufacturing accuracy is required for gears of gear pumps to achieve a high-quality pumping action, for example to avoid leakage at end faces of gears where they abut onto associated stationary surfaces. Manufacturing tolerances to within microns is often required, making gear pumps high-precision specialist high-performance devices. To benefit from such high-performance, it is also important that dynamic control of the gear pumps is of correspondingly of a high performance, as will be described in greater detail later (see below).

Screw Pump

A screw pump is implemented as a single screw pump or as a multiple screw pump; the multiple screw pump includes two or more screws. A substrate, for example a fluid, for example a liquid or gas, is carried by threads of a given single screw that is rotated in operation by using a motor along a stationary element such as a cylindrical cavity, in a case of a single screw pump. A multiple screw pump, namely including two or more screws, includes a rotating drive screw and one or more idler screws. In operation, a rotation of the screws of the multiple screw pump pulls the substrate, for example a fluid, for example a liquid or gas, from a fluid inlet port, wherein the substrate is carried in cavities formed by the screw threads and further pumped through a fluid outlet port.

Reciprocating Pump

A reciprocating pump is implemented in operation as an oscillating pump module including one or more pistons, plungers or diaphragms and valves to restrict the flow of a substrate, for example a fluid, for example a liquid or gas, in a desired flow direction. A piston pump includes a piston, a chamber and valves at an inlet port of the piston pump, and at an outlet port of the piston pump. A reciprocating motion of the piston is optionally provided through a crank connected to a motor and a shaft coupling the crank with the piston. A diaphragm pump is optionally implemented to include a flexible diaphragm that reciprocates in operation between two positions, and to include valves at both sides of the diaphragm. In operation, a substrate, for example a fluid, for example a liquid or gas, is pulled into the pump using suction created at an inlet port when the diaphragm moves up, and as the diaphragm moves down, the substrate is pumped out.

Substrate

A "substrate" with respect to a gear pump refers to any substance that can be pumped or dispensed by the gear pump, for example an emulsion, a powder, a liquid, a gas, a foam, a gel, and so forth. Moreover, the substrate is optionally referred to as being a feedstock, and accordingly is interchangeably used when describing embodiments of the present disclosure. In an example, the substrate includes a liquid or gel that is able to flow. It will be appreciated that the gear pump is capable of being used in multiple technical fields, such as medicine research and production, food processing and production, chemical industries, oil and gas industries, water treatment industries, in power generation industries, in fuel delivery systems and so forth For example, the substrate is anything that is compatible with components of a gear pump and that is not too viscous to be pumped including, without limitation, an oil, a chemical, a cosmetic product such as a perfume or a lotion, medicines, veterinary products, liquid foods or sauces, glues, paints and other such products.

Volumetric Control

Volumetric control refers to controlling an amount of the fluid to be pumped by a gear pump. Typically, gear pumps include gears having regular teeth and spaces between them; the gears are closely fitted inside a channel of a pump cylinder, wherein the gears provide a uniform volume formed by spaces between each of the gear teeth and the pump cylinder. Therefore, the gear pump is optionally used in processes wherein volumetric control is required, requiring that exact rotations, or exact fraction of a rotation, of a drive shaft of the gear pump be measured and controlled.

Motor

In one embodiment of the present disclosure, a motor is driven, and its shaft is monitored to determine its angular position and correspondingly speed control. For example, asynchronous motors or synchronous motors are employed to drive the shaft. In an embodiment, an asynchronous motor, such as a brush DC motor, an AC induction motor, and so forth, is operated with position and speed control being utilized. Specifically, a suitable servo drive, a position sensor, and/or a speed sensor is used to control the asynchronous motor. In another embodiment, a synchronous motor is operated as elucidated in the foregoing, with closed loop control of position and/or speed, in order to enhance its performance, for example dynamic response or "stiffness" (invariance of response under varying operating loads). In another embodiment, a synchronous motor is operated by employing position and speed control in an open-loop configuration, namely without position or speed feedback.

Such a synchronous motor is implemented, for example, as a stepper motor. Therefore, in such an embodiment, a low pole count synchronous motor may be replaced by a stepper motor. Optionally, an open loop stepper drive is used, and a rotary encoder is omitted.

In an example embodiment, the motor is a servomotor that is operable to function based upon a positional feedback voltage signal provided in operation from an encoder, that allows a controller to modulate a motor drive voltage, or applied electrical power, so as to control very precisely a speed and/or position of a shaft if the motor; by "very precisely" is meant, for example, to an angular resolution that is less than a tooth angle of a gear employed in a gear pump, for example to an angular resolution in a range of a gear tooth angle to 10% of a gear tooth angle. Moreover, the motor is optionally a brushless three phase motor, more optionally a brushless three phase synchronous motor, for example a three-phase motor that is designed to provide a considerable amount of torque over a large rotational speed range. The motor primarily operates or converts electrical signals provided from a power source into mechanical energy for moving or driving a mechanical component, particularly a drive shaft of the motor. The motor includes various components, which are explained in greater detail below.

Motor Casing

A motor casing is an outer protective covering of a motor that is arranged, namely configured, to house internal components of the motor, such as a motor stator and a motor rotor. In an embodiment, the motor casing is arranged, namely configured, to be a hollow cylindrical structure; however, the motor casing optionally has any other shape that is utilized for convenient housing of the internal components. The motor casing is optionally made of an insulating material, such as a plastics material, optionally with a metallic base. Alternatively, the motor casing is made of a metallic material, for example an alloy such as steel, or cast Aluminium. Furthermore, the motor casing is optionally made by utilizing a suitable manufacturing technique such as CNC machining, press-forming, injection moulding and the like. The motor casing is operable, namely adapted, to support rigidly the motor stator and the motor rotor therein. The motor casing also includes a few small holes for allowing motor power wiring to pass therethrough, which allows electric energy to flow to different parts of the motor.

Motor Stator

A motor stator is a stationary part of a motor that is supported and covered by a motor housing. For example, the motor stator is arranged, namely configured, to have a cylindrical shape, wherein the cylindrical shape has a smaller diameter compared to the motor casing, such that the motor stator is housed within the motor casing. In an example embodiment, the motor stator is an electromagnet, including windings supported over a cylindrical frame. The windings are optionally manufactured from copper; otherwise, the winding is manufactured from another material having a higher electrical conductivity, such as Aluminium or Silver. Furthermore, the motor stator optionally includes metallic and/or alloy laminations to reduce energy losses.

Motor Rotor

A motor rotor constitutes a rotating part of a motor. The motor rotor is manufactured to have a cylindrical shape, either with a smaller diameter compared to a corresponding motor stator (namely, an "in-runner"), or alternatively with a target diameter compared to a corresponding motor stator, such that it can cover the motor stator (namely, an "outrunner"), or alternatively it can be of substantially a same diameter to the motor stator and be assembled axially close to the stator (for example, a disk or puck motor). In an embodiment, the motor rotor is a permanent magnet; otherwise the motor rotor is an electromagnet. For example, the motor rotor has windings manufactured from a highly electrically conductive metal or from specific alloys, such as steel.

The motor rotor rotates in operation generally under an influence of a magnetic field. In operation, the motor rotor operates through an interaction between its own magnetic field and a magnetic field, namely opposite in nature, produced by winding currents of a motor stator.

Drive Shaft

A motor includes a drive shaft for providing a mechanical output in response to receiving an electrical input. Typically, the drive shaft is an elongate cylindrical element supported by bearings at one end of a motor casing and at another point (i.e. location) along its length (for example, at its other end on a pump head casing. In an embodiment, both ends of the drive shaft are supported with bearings for having minimum friction when rotating in operation. Furthermore, the drive shaft is also arranged, namely configured, to rotate under an influence of a magnetic field. Specifically, a motor rotor is mounted on a drive shaft, therefore with a rotation, or partial rotation of the motor rotor, the drive shaft is operable to rotate. In an example embodiment, the motor rotor is mounted rigidly onto the drive shaft, for example the motor rotor and the drive shaft are a unitary component.

Optionally, the drive shaft may be split one or more times along its length, with these parts coupled by rigid or flexible couplings, such as rigid collar couplings, spring beam couplings, bellows couplings, or magnetic couplings, for example in order to facilitate manufacture or maintenance of the pump, to accommodate static or dynamic misalignment of the components, or to reduce vibration or limit shock loads.

Front Bearing and Rear Bearing

A front bearing and a rear bearing are employed to constrain a motion of the shaft towards solely (namely, purely) rotation around its intended rotational axis, to reduce, for example to minimize, friction and allow easy rotation of a drive shaft therebetween. Both the front bearing and the rear bearing are coaxially attached on end portions of the rotatable drive shaft, for example with the front bearing being received in a through opening provided in the pump head casing, and the rear bearing being received in a cut-out provided in the motor casing. In an example embodiment, the front and rear bearings are sleeve bearing, ball bearings or roller bearings.

Typically, components of an example gear pump are arranged in a following order: bearing→motor→bearing→pump. In other embodiments, this configuration is optionally varied depending on expected loads and volumes of a fluid, for example a liquid or gas, to be pumped by attaching a further bearing after the pump or by placing the second bearing after the pump, giving either a bearing→motor→bearing→pump→bearing configuration or a bearing→motor→pump→bearing configuration. Furthermore, the bearings are optionally a single row deep groove bearing arrangement, a double row angular contact bearing arrangement and the like. Furthermore, the bearings are optionally a single row deep groove bearing arrangement, a double row angular contact bearing arrangement and the like.

Drive Gear and Idler Gear

Typically, a gear pump includes two gears, namely a drive gear and an idler gear; these two gears are optionally fabricated from a metal, from a plastics material (for example "peek" (polyaryletherketone) or nylon (polyamide)), from a ceramics material, from an amorphous material (for example a glassy material) or other strong materials. In an example embodiment, both the drive and idler gears include an involute gear profile. Thus, in an involute gear profile, the drive gear and the idler gear form a gear train having a gear ratio equal to 1. Specifically, both the drive and idler gears are of equal diameter, and include an equal number of teeth on the gears. Alternatively, the drive gear and the idler gear form a gear train having a gear ratio that is more than 1, or is less than 1. Moreover, alternatively, the gears have another exterior surface profile, such as a cycloid or a double circular arc. Furthermore, alternatively, the gears have mutually complementary exterior surface profiles, wherein the exterior surface profiles ae mutually different. Furthermore, the drive gear is optionally operable, namely adapted, to be mounted onto a part of a drive shaft that protrudes beyond a front bearing, whereas the idler gear is operable, namely adapted, to engage with the drive gear for providing a pumping function. Optionally, to avoid backlash between the gears, the idler gear is provided with viscous drag (for example via electromagnetic induction drag when the idler gear is fabricated from a conductive material and rotates within a strong magnetic field (for example in a range of 0.1 to 1 Tesla) and thus the drive gear is always angularly advanced relative to the idler gear.

In an example embodiment, the drive gear is mounted over an annular magnet, coupled to the drive shaft, which is explained in greater detail below. Specifically, the drive gear conforms to an external surface of the annular magnet (namely surrounds the annular magnet) and is detachably or permanently fixed to the annular magnet using a suitable coupling arrangement, such as a key-and-slot arrangement, or by using an adhesive. Furthermore, the drive gear and the idler gear are arranged, namely adapted, to be received in a channel of a pump cylinder, namely as explained in greater detail below.

In operation, the drive gear is rotated by the drive shaft of the motor, and the idler gear is rotated by the drive gear. In an example embodiment, the drive gear and the idler gear rotate in mutually opposite rotation directions, and pull the substrate, for example a fluid, for example a liquid or gas, into the channel and thereafter push the substrate out from the channel, namely pump the substrate from the channel. For example, with the rotation of the drive shaft, the drive gear rotates in an anti-clockwise direction and the idler gear rotates in a clockwise direction, and teeth of the drive and idler gears mutually mesh in a middle region of the channel, and are operable to pull the substrate into the channel and thereafter push the substrate out from the channel. As aforementioned, the idler gear optionally has viscous drag applied thereto to avoid backlash arising in the drive and idler gears. Such backlash is otherwise potentially susceptible of causing one of more servo loops, for example a plurality of nested servo loops, of the controller to function in an unstable manner.

Pump Head Casing:

The pump head casing is arranged, namely configured, to have a cylindrical shape, otherwise it is arranged to have another shape such as a cuboidal shape. Furthermore, the pump head casing is optionally manufactured from a suitable material such as a plastics material, rubber, a metal or any combination thereof; there is beneficially employed a suitable manufacturing method such as injection moulding, compression moulding and thermoforming, but not limited thereto.

The pump head casing includes a circular cut-out that provides a hollow construction to the pump head casing. Specifically, the circular cut-out is big enough so that the pump head casing is hollow. Alternatively, the pump head casing includes a cut-out of other shapes, such as a rectangular shape or an oval shape, so that the pump head casing is hollow. The pump head casing also includes a through opening arranged, namely configured, centrally thereon. The through opening conforms to an external surface of the rear bearing, namely arranged, namely adapted, to be mounted on the drive shaft of the motor. Specifically, the through opening of the pump head casing is arranged, namely adapted, to accommodate the rear bearing and provide a frictionless movement between the pump head casing and the drive shaft of the motor.

Pump Cylinder

The pump cylinder includes a cylindrical shape essentially conforming to the circular cut-out shape of the pump head casing. Alternatively, the pump cylinder is arranged, namely configured, to have other shapes, such as a rectangular shape or an oval shape, but essentially conforming to the cut-out shape of the pump head casing, such that the pump cylinder is accommodated in the cut-out of the pump head casing. The pump cylinder is also made of a suitable material such as a plastics material, rubber, a metal or any combination thereof, and using a suitable manufacturing method such as CNC machining, injection moulding, compression moulding and thermoforming.

The pump cylinder includes a channel (namely a through opening) conforming to external surfaces of the drive gear and the idler gear. Specifically, the channel conforms to the external surfaces of the drive gear and the idler gear, when the drive gear and the idler gear are in a meshed or mutually engaged arrangement. The channel of the pump cylinder is therefore capable of accommodating the drive gear and the idler gear when the drive gear and the idler gear are mutually meshed, and allows rotation of the drive gear and the idler gear therein. The channel is also arranged, namely configured, to have side openings (on either sides of the channel), and in line with the fluid inlet port and fluid outlet port of the pump. Furthermore, the rotation of the drive gear and the idler gear within the channel of the pump cylinder is operable to create a suction pressure zone at a side opening, namely on the fluid inlet port side, and an ejection pressure zone at another side opening, namely on the fluid outlet port side. Moreover, the drive gear and the idler gear are arranged to provide uniform and defined gaps therebetween, for allowing a small but uniform amount of substrate, for example a fluid, to displace from the side opening, on the fluid inlet port side, to the side opening, on the fluid outlet port side, of the channel of the pump cylinder.

Pump Face

The pump face is also arranged, namely configured, to have a cylindrical shape to conform to the cylindrical shape of the pump head casing. Alternatively, the pump face is arranged, namely configured, to have other shapes, such as a cuboidal shape, but essentially is capable of being coupled to the pump head casing. The pump face is coupled to the pump head casing, using a suitable coupling arrangement such as bolts or clamps. The pump face is optionally made of a suitable material such as a plastics material, rubber, a metal or any combination thereof, and using a suitable manufacturing method such as CNC machining, injection moulding, compression moulding and thermoforming.

The pump face of the gear pump constitutes an exterior surface of the pump housing. Specifically, the pump face acts as a front face of the gear pump and accommodates the fluid inlet port and the fluid outlet port for the substrate. The fluid inlet and outlet ports are circular through-holes arranged on the pump face. Furthermore, the fluid inlet and outlet ports are optionally disposed in a mutually similar plane. Optionally, the fluid inlet and outlet ports are either parallel to each other, or perpendicular to each other. Alternatively, the fluid inlet and outlet ports are optionally adjacent to each other or placed in any other position relative to each other on the pump face for allowing their intended function of permitting the substrate, for example a fluid, for example a liquid or gas, to flow into and from the pump. In operation, the fluid inlet and outlet ports are provided with pipes or conduits, for example made of a metal or a plastics material, permitting the substrate to flow into and from the pump.

In an example embodiment, the pump face also includes a trench, namely not a through opening, namely extending from an outer surface to an inner surface of the pump face. The trench is optionally a rectangular cut-out, otherwise it is arranged, namely configured, to have a circular or other shape. Furthermore, the trench is centrally configured on the pump face and disposed between the fluid inlet and outlet ports of the pump face so as to be in an optimal proximity, for example, to the annular magnet embedded in the driven gear which is immediately behind the pump face.

Sensor Target

A sensor target is operatively coupled with the drive shaft; alternatively, or additionally, the sensor target is included as an integral part of gears of a gear pump, for example. For example, the sensor target is mounted on the drive shaft and has a property (such as electrical, optical, magnetic, capacitance associated therewith). Therefore, as the motor shaft rotates, the sensor target rotates, to cause a change in the property of the sensor target. The sensor that is positioned in the proximity of the sensor target detects the change in the property and produces an output signal which further corresponds to the rotational position of the sensor target, and therefrom vicariously the rotational position of the drive shaft.

Annular Magnet

In an example embodiment, magnetic sensing of the angular position of the drive shaft is employed. For such magnetic sensing, the sensor target includes an annular magnet arrangement, for example an annular magnet; the annular magnet is optionally a permanent magnet made from a material that is magnetized and creates its own persistent magnetic field. The annular magnet is arranged, namely configured, to have a cylindrical shape with a cylindrical hole along its central axis. Optionally, the annular magnet is of a larger diameter compared to an axial thickness of the annular magnet. Alternatively, the annular magnet is optionally arranged to be of smaller or same diameter compared to the axial thickness of the annular magnet.

The annular magnet arrangement is arranged, namely adapted, to be placed around, and fixed coaxially, with the drive shaft of the motor. For example, the cylindrical hole of the annular magnet is large enough to conform to a diameter of the drive shaft, and is detachably or permanently fixed to the drive shaft using a suitable coupling arrangement, such as a key and slot arrangement or by using an adhesive. Furthermore, the annular magnet is optionally surrounded by the drive gear, particularly, the drive gear including a circular hole that is large enough to conform to an external diametrical surface of the annular magnet to surround the annular magnet.

Furthermore, the annular magnet arrangement is optionally magnetised diametrically, rather than axially, for optimum signal generation or induction. In operation, the annular magnet is arranged, namely adapted, to be rotated with the rotation of the drive shaft to generate Hall Effect signals or voltage signals. Specifically, rotation of the annular magnet causes oscillation of an associated magnetic field around the annular magnet. For example, the oscillation of the magnetic field associated with the annular magnet results in electrical cycles of sine and cosine voltage signals, based on the number of magnetic pole pairs ("South" and "North" poles) in the annular magnet.

Sensor

The sensor is optionally a magnetic sensor, such as a Hall Effect array. However, for sensor targets other than magnetic targets, there is optionally employed an electrostatic sensor (namely, a variable capacitance sensor), an inductive sensor, a mechanical sensor and so forth. The sensor, whatever type is utilized, is disposed on or proximal to the exterior surface of the pump housing. In an example, the exterior surface of the pump housing includes a pump face and the pump face includes a trench, wherein the sensor is disposed at least partially within the trench. Specifically, the trench is configured on the pump face such that a distance between the sensor and the sensor target is reduced and the sensor can easily and efficiently sense or measure the rotation of the sensor target. Moreover, the trench is positioned, namely configured, in the pump face, such that the sensor is disposed coaxially with the sensor target, namely symmetrically with respect to a central axis of the annular ring, when a magnetic sensor is employed. Alternatively, the trench is optionally arranged, namely configured, on the pump face asymmetrically with respect to the central axis of the annular ring, when a magnetic sensor is employed, and the sensor is optionally positioned non-coaxially with respect to the sensor target. Furthermore, the sensor may be coupled to the trench using a suitable coupling arrangement such as glue or mechanical clamps.

The position of the sensor on the trench of the pump face isolates the sensors from the substrate, namely from a fluid, for example a liquid or gas. Specifically, the substrate enters into and exits from the channel through the fluid inlet and outlet ports provided in the pump face. Therefore, there is no possibility, in such an implementation, of any interaction between the sensor and the substrate, with the pump face between the channel and the sensor.

In operation, when a magnetic sensor is employed, the magnetic sensor is operable, namely adapted, to sense the rotation of the annular magnet and generate an output signal corresponding to a rotational position of the drive shaft. The magnetic sensor is operable, namely configured, to generate the output signal in the form of a Hall Effect voltage in response to the rotation of the annular magnet. Specifically, when the annular magnet is rotated, the oscillation of the magnetic field associated with the annular magnet generates a voltage signal or the Hall Effect voltage, which are sensed by the sensor. Furthermore, such Hall Effect voltage corresponds to the rotational position of the drive shaft, since the Hall Effect voltage changes with a portion of a rotation, or a number of rotations, namely an angular position, of the annular magnet. Specifically, for different number of rotations, or angular positions, of the annular magnet, the drive shaft attains different rotational positions and generates different Hall Effect voltage. For example, if the annular magnet rotates one complete cycle (or 360 degrees), the sensor generates an output signal (or a Hall Effect voltage of between 3.3 and 5 volts) corresponding to the oscillation of the magnetic field associated with one complete rotation of the annular magnet. Furthermore, the output signal generated by the sensor corresponds to the rotational position of the drive shaft, for example to an accuracy and/or a resolution error of less than 1 degree, more optionally to an accuracy and/or resolution error of less than 0.25 degrees, and yet more optionally to an accuracy and/or resolution error of less than 0.1 degrees, since the annular magnet is mounted on the drive shaft and associated with the angular displacement of the annular magnet. It will be appreciated that such high accuracies pertain also to other types of sensors as described herein, for example non-magnetic types of sensors. Therefore, the sensor generates different output signals (or Hall Effect voltage) corresponding to different number of rotations (such as 2, 3 . . . n rotations) or angular positions (such as 30, 45, . . . 90°) of the annular magnet.

Optical Sensor

In an example embodiment of the present disclosure, there is employed an optical sensor optionally including a photodetector array. In an example embodiment, the sensor target has alternate transparent and opaque patterns such as lines, and is optionally coupled to the drive shaft and placed in the path of a light source. As the drive shaft rotates, the light source is alternatively blocked and unblocked (namely interrupted) which is sensed by the photodetector array. The alternating light beam sensed by the photodetector array is converted into an optical potential (such as an electrical signal or voltage). The optical potential is further sent to be analysed, for example in a data processing arrangement in including computing hardware that is operable to execute one or more software products including program instructions, to determine the rotational speed of the drive shaft. Additionally, the pump face is optionally made of an optically transparent material for the photodetector array to sense the light beam passing through the sensor target; the optically transparent material is, for example, a glass, a plastics material such as polycarbonate plastics material or similar. However, it will be appreciated that such an optical sensor employs a light source such as a solid-state laser, a light emitting diode, a nanowire plasmon resonance light source, an organic light emitting diode and so forth. Optionally, light for the optical sensor is conveyed via an optical fibre or light guide, for example via a port on a housing of the gear pump. Optionally, the optical sensor is remote from the gear pump housing and optically coupled, for example via an optical fibre. Such an arrangement is of benefit because optical-fibre-based sensors are immune to electromagnetic interference and are potentially also robust against ionizing radiation, for example in a situation where a fluid to be pumped is radioactive (for example, when performing nuclear waste reprocessing).

Electrostatic Sensor

An electrostatic sensor, namely a variable capacitance sensor, is beneficially employed for measuring the rotational speed of at least one of: the drive shaft, the drive gear, the idler gear, for example on both the drive shaft and also the drive gear or idler gear, for example in ultra-precise pumping situation wherein any backlash in the gear pump has to be compensated by the controller. Such an electrostatic sensor optionally includes a pair of electrodes defining a spatial region therebetween. Changes in dielectric permittivity and/or conductivity within the spatial region is capable of resulting in corresponding changes in capacitance that is sensed between the pair of electrodes for generating an output signal for processing by the controller.

The change in capacitance is susceptible to being detected in several different ways. For example, a capacitance provided between the pair of electrodes can be used to define an operating frequency of an oscillator, for example an LC resonant oscillator, wherein changes in frequency of the oscillator are indicative of changes within the spatial region; a phase-lock-loop can be used, for example, to measure the frequency. Alternatively, the capacitance provided between the pair of electrodes can be employed as part of a capacitive potential divider or a Wheatstone bridge that is provided with an a.c. excitation signal.

Optionally, the pair of electrodes is included in the pump face and shielded from the substrate by a thin dielectric layer; moreover, the gears of a gear pump, to be sensed by such an electrostatic sensor are provided with conductive or dielectric features, for example accommodated recesses or inserts, or deposited onto the gears, for example arranged in a radial manner, that vary as a function of a rotational position of the gears; such features correspond to the aforementioned "sensor target". Optionally, the pair of electrodes is conveniently arranged such that each electrode is elongate and disposed in a radial manner also. By such an approach, elongate radially-disposed electrodes used to detect elongate radially-disposed conductors or dielectric features can provide a high degree of angular resolution when detecting angular position of gears of a gear pump.

Thus, a dielectric layer disposed between the pair of electrodes is arranged so that its thickness and/or relative permittivity changes as a function of rotation of the dielectric layer, wherein the dielectric layer is mounted to a shaft or gear. As a result, in operation, a capacitance provided between the two electrodes varies as a function of rotation of the dielectric layer. In an example embodiment, the capacitance is employed to define an operating frequency of an oscillator, as aforementioned wherein the operating frequency is measured for determining an angular position of the dielectric layer. In another embodiment, the capacitance is employed in an a.c. Wheatstone bridge circuit arrangement or an a.c. potential divider circuit arrangement for providing an a.c. signal output whose amplitude is a function of an angular position of the dielectric layer. In such a Wheatstone bridge circuit arrangement or a.c. potential divider, an a.c. excitation signal for the Wheatstone bridge or a.c. potential divider circuit, and synchronous detection of a difference signal from the Wheatstone bridge circuit arrangement or from the a.c. potential divider circuit is employed, to reduce effects of asynchronous external interfering signals. Such an electrostatic sensor is especially beneficial when very high accuracy of operation is required for the gear pump when its gears revolve at extremely high speeds, where induced eddy-currents associated with magnetic sensors would result in measurement inaccuracies. The electrostatic sensor is capable of providing in operation, for example, an angular position measurement to an accuracy and/or a resolution error of less than 1 degree, more optionally to an accuracy and/or resolution error of less than 0.25 degrees, and yet more optionally to an accuracy and/or resolution error of less than 0.1 degrees, Inductive Sensor An inductive sensor is operable to exhibit a change in inductance as conductive materials or magnetic materials are brought in close spatial proximity of the inductive sensor. For example, the inductive sensor is implemented as a coil, and a gear of a gear pump is fabricated from a plastics material, for example "peek" or ceramic as aforementioned, wherein recesses are formed into the peek or ceramic for accommodating ferromagnetic or conductive inserts, for example elongate inserts that are disposed radially in the gear.

In another embodiment, the pump face is fabricated from a plastic material and the inductive sensor is implemented as a coil, namely an electrical winding. Optionally, a magnetic core, for example fabricated from a ferrite material or magnetic laminate material, is included at a centre of the coil. When a given gear of a gear pump is fabricated from a ferromagnetic material, for example from a magnetic steel, allow surface indents and striations on the gear can be sensed using the inductive sensor. In an example embodiment, the sensor target is a disc (or ring) with teeth positioned in front of the inductive sensor such that the magnetic field of a permanent magnet included in the inductive sensor extends to the disc. The disc is further coupled to the drive shaft. As the shaft rotates, the disc is also rotated. A tooth of the disc that is in front of the inductive sensor concentrates the magnetic field and further, amplifies the magnetic flux in the coil whereas the space between the teeth in front of the sensor reduces the magnetic flux in the coil. The changes in the magnetic flux induce an a.c. voltage in the coil which can be analysed to determine the rotational speed of the shaft.

Controller

The controller is operatively coupled to the sensor for receiving the output signal(s), for example a Hall Effect voltage, of the sensor; moreover, the controller is operatively coupled to the motor for controlling a drive current or an excitation voltage that is applied to the motor. The controller includes a plurality of electronic components, such a microcontroller, a power source (and/or a battery), line drivers, signal encoders and converters, power transistors, antennae and data memories. Such components of the controller may be integrated together or disposed in a distributed manner, namely communicating with each other and the sensor(s) via any combination of wired links, optical fibres, or radio or optical wireless links In an embodiment, the controller is a servo-controller (namely, a controller of the motor). Alternatively, the controller is operatively coupled to the sensor to form a unitary electronic unit, which is spatially separate from the servo-controller. Conveniently, a micropower microcontroller is employed when constructing the controller, alternatively a low-power RISC processor.

The controller is operable, namely configured, to calculate the rotational position of the drive shaft based upon the output signal of the sensor; for such calculation, there can be used look-up tables, polynomial models, or artificial intelligence (AI) learned computations. Specifically, the controller is operable to identify a relationship between the sensor signal, for example the Hall Effect voltage or the output signal (namely a strength of a magnetic field caused by the rotation of the annular magnet) generated by the sensor, and the rotational position of the drive shaft. It will be appreciated that the controller (particularly the microcontroller) is optionally operable to execute an algorithm for associating the measurement data from the sensors (for example, a normalized Hall Effect voltage) with the rotational position of the drive shaft. Furthermore, there is optionally a linear relationship between the rotational position of the drive shaft and the output signal of the sensor, and the output signal of the sensor is optionally an absolute value corresponding to the rotational position of the drive shaft; alternatively, there is optionally a polynomial relationship between the rotational position of the drive shaft and the output signal of the sensor, wherein the algorithm is arranged to take into account such a polynomial relationship, for example by way of employing spline coefficients. For example, the controller is operable to calculate (or correlate) the rotational position of the drive shaft to be 30°, 90°, 360°, 720° and the like based on the multiple output signal of the sensor. However, it will be appreciated that embodiments of the present disclosure are capable of being implemented to have an angular measurement resolution and/or accuracy error of less than 1 degree, more optionally, less than 0.25 degrees.

The controller is also operable, namely configured, to control the motor based upon the calculated rotational position to ensure that an accurate volume of fluid is pumped. Specifically, the controller is operatively coupled to an electrical power source of the motor, such that the controller determines the amount of electrical power that is provided to the motor from the electrical power source. The drive shaft of the motor is operable, namely configured, to have a determined amount of rotation based on the amount of electrical power provided to it. This causes an approximately predetermined volume of fluid to be pumped or dispensed by the pump based on the amount of rotation of the drive shaft thereof.

Beneficially, in such control, any volumetric delivery error caused by deviation of the actual volume delivery rate with pump shaft rotation from the expected volume delivery rate can be compensated for by additional layers of closed loop control, for example by using nested feedback loops. Any error or source of error can be measured and an appropriate negative feedback can be added to the control network, as described later (see below).

To give an example of compensation for a source of error, the actual delivery rate depends slightly on the pressure developed across the pump, from its inlet port to its outlet port. Such a pressure difference is conveniently measured in operation by using a Silicon micromachined pressure sensor, a bellows-type pressure sensor or similar. By applying an appropriate transformation (for example a linear or polynomial transfer function, for example a Bezier spline, or for example a stateful transformation such as a finite impulse filter network or hysteresis model) to the measured pressure difference, the controller can derive an approximation of the pressure induced volume rate error and beneficially apply a compensating negative feedback to the commanded shaft position in order to thereby more accurately deliver the commanded volume.

To give an example of compensation for an error, the volume delivered by pump depends on the position of the movable pumping elements. Since no mechanical linkage is perfectly rigid, there is some deviation between the position of the drive shaft and the position of the pumping elements. For very high accuracy operation, the pump can be beneficially equipped with one or more additional position encoders, measuring the position of the movable pump elements. The controller can then compensate for the remaining error between the actual and intended position of the pumping elements by applying a suitable negative feedback scheme (for example, PID) from the calculated position error to the commanded shaft position, in order to thereby more accurately deliver the commanded volume.

PID is an abbreviation for "proportional", "integral" and "differential". Moreover, PID feedback control involves using a feedback function F(x) as negative feedback for a system having an open-loop transfer function G(x), wherein the feedback function F(x) is defined by:

$$F(x) = A_1 x + A_2 dx/dt + A_3 \int x \cdot dt \qquad \text{Eq. 1}$$

wherein
$A_1$=proportion coefficient;
$A_2$=differential coefficient; and
$A_3$=integral coefficient.
However, in a generalized case, it will be appreciated that Equation 1 (Eq. 1) can be extended to include higher-order terms than merely first-order differential and integral terms, for example including also $d^2x/dt^2$ terms and second-order integral terms.

The open-loop transfer function G(x) can be complex, for example including resonances and transport delays, making it difficult to control with negative feedback. When the function F is utilized, for example Eq. 1, its coefficients A can be selected to achieve a stable feedback operation without encountering feedback oscillations in practical dynamic working conditions.

To give a further example of compensation for an error, for example in a gear pump, there are multiple further sources of volumetric delivery variation even relative to the position of the pumping elements, for example variations in substrate properties (viscosity or in general rheology, elasticity, density, etc), for example due to variations in temperature or chemical or phase composition (entrained particulates, mixtures of multiple fluid phases such as emulsions or foams, etc). For the highest possible accuracy, the pump can be beneficially equipped with one or more sensors that measure the volume or mass of substrate delivered, such as an idle gear pump flow meter, an ultrasonic (for example, Doppler) flow meter, a reaction force mass flow meter, a chemical concentration sensor, a strain gauge or other means of measuring the total mass delivered, or a float gauge, optical surface position measure, or other means of measuring the total volume delivered. The controller can then compensate for the remaining error between the actual and intended volume (or mass) delivery by applying a suitable negative feedback scheme (for example, PID) from the calculated volume (or mass) error to the commanded shaft position, in order to thereby more accurately deliver the commanded volume. As described below, although using a single PID feedback loop using the aforementioned feedback function F (see Equation 1 (Eq. 1)) can improve a closed-loop performance of a given gear pump, even greater accuracy is achievable using various configurations of nested feedback loops, for example nested PID feedback loops.

Accordingly, by controlling the rotational position of the drive shaft, pumping of the accurate volume of fluid by the gear pump can be attained. For example, if the gear pump is provided (or instructed) with a command for dispensing (or pumping) one litre of fluid, the controller monitors the angular position of the drive shaft based upon the output signal of the sensor. Thereafter, the controller compares the monitored angular position of the drive shaft with a target angular position of the drive shaft (corresponding to the one litre of fluid) with which the controller is trained. Specifically, the controller is configured or optionally trained with measurement data associated with the rotational position of the drive shaft based on the output signal generated by the sensor corresponding to such rotational position of the drive shaft. The rotational position of the drive shaft corresponds to (namely is associated with) a pumping or dispensing capacity of the gear pump and is susceptible to being computed; therefore, the amount of electrical power provided to the gear pump controls the pumping or dispensing action of the gear pump.

Therefore, in an example embodiment, the controller computes, namely detects, any difference between the monitored angular position and the pre-determined angular position of the drive shaft; the controller corrects or regulates the electrical power to the motor. The correction of electrical power to the motor causes the drive shaft to attain the pre-determined angular position from the monitored angular position. This allows the gear pump to dispense or pump an accurate volume, such as one litre, of fluid by the gear pump. However, it will be appreciated that embodiments of the present disclosure are capable of being implemented to have an angular measurement resolution and/or accuracy error of less than 1 degree, more optionally, less than 0.25 degrees.

In an example embodiment, data from the servo-controller, such as speed, torque, position, and so forth, are cross-referenced with sensor data for achieving an enhanced accuracy, a process control, and for monitoring overall system health of the gear pump and its associated parts. In an example embodiment, adding a differential pressure sensor across the gear pump is beneficial in that it allows distinguishing between changes in mechanical losses in the pump (for example, due to wearing out of the pump rotor) and viscous losses in the substrate (for example, due to increased suspended particle loads or polymer chain lengths). Furthermore, in such an example embodiment, a closed loop control of pressure is possible and accuracy of volumetric control is enhanced by modelling and compensating for variations in volume transport with varying pressure (as described above). In another example embodiment, adding a flow meter in line with the gear pump optionally enhances failure detection by cross checking expected and measured behaviour at the pump and the flow meter. In such an example embodiment, an accuracy of volumetric control is enhanced by adding an outer servo loop which senses flow at the flow meter and actuates the pump position (as described above). In yet another example embodiment, the differential pressure sensor is optionally added across and the flow meter and is optionally added in line with the pump. In such an example embodiment, a viscosity of the substrate is inferred from torque, pressure, and flow rate measurements made on the gear pump. Furthermore, an accuracy of detection of wear in the pump head, as shown by internal leakage, is optionally increased by measuring a pressure-to-volume-ratio-per-revolution of the drive shaft, while modelling the expected value from the inferred viscosity.

DESCRIPTION OF PREFERRED EMBODIMENTS

The following detailed description illustrates preferred embodiments of the present disclosure and ways in which they can be implemented. Although some modes of carrying out the present disclosure have been disclosed, those skilled in the art would recognize that other embodiments for carrying out or practicing the present disclosure are also possible.

In FIG. 1, there is provided a schematic view of a device 10 for pumping fluid, namely an implementation of a gear pump, in accordance with an embodiment of the present disclosure. The device 10 includes a motor 20 for driving a rotatable drive shaft 22. The device 10 also includes a pump module 30 to be driven by the drive shaft 22. The device 10 further includes a sensor target 40 that is operatively associated with the drive shaft 22. The device 10 also includes a sensor 50 for sensing a change in a property of the sensor target 40 with the rotation of the drive shaft 22, and for generating an output signal corresponding to a rotational position of the drive shaft 22; the sensor 50 is beneficially implemented magnetically, inductively, electrostatically (variable capacitance), for example as described in the foregoing. The device 10 further includes a pump housing 60 to accommodate the pump module 30 therein. The pump housing 60 includes an exterior surface 62. The sensor 50 is disposed on (or proximal to) the exterior surface 62 of the pump housing 60; optionally, the sensor 50 is mounted external to the pump housing 60; alternatively, optionally, the sensor 50 is mounted internally to the pump housing 60. Furthermore, the exterior surface 62 of the pump housing 60 comprises (or is) a pump face. Moreover, the pump face (or the exterior surface 62) defines a fluid inlet port 70 and a fluid outlet port 72. The device 10 further includes a controller 80 that is operable, namely configured, to calculate the rotational position of the drive shaft 22 based upon the output signal, and control the motor 20 based upon the calculated rotational position to ensure that an accurate volume of fluid is pumped.

Figure 2:
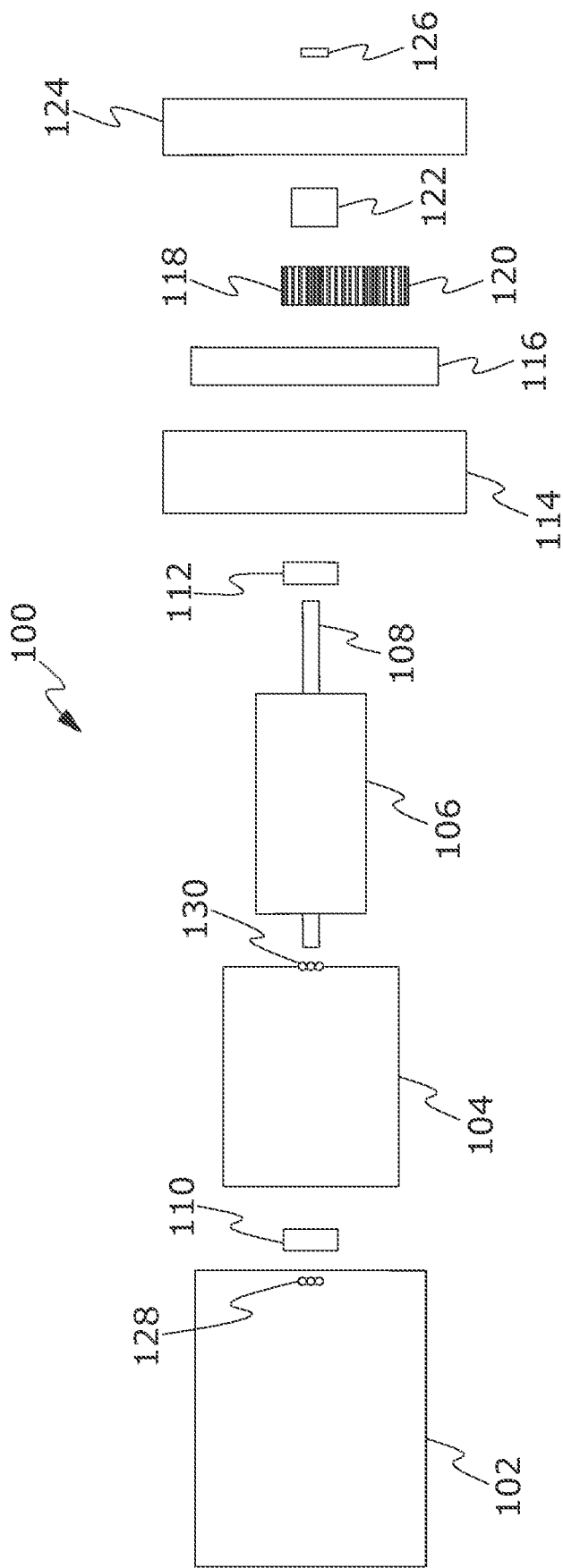
FIG. 2 is an exploded plan view of a gear pump, in accordance with an embodiment of the present disclosure.

In FIG. 2, there is provided an exploded plan view of a gear pump 100, in accordance with an example embodiment of the present disclosure. It will be appreciated that the gear pump 100 is a particular type of device for pumping fluid, for example such as the device 10. As shown, the gear pump 100 includes a motor having a motor casing 102, a motor stator 104, a motor rotor 106, a drive shaft 108, a rear bearing 110 and a front bearing 112. The gear pump 100 also includes a pump head casing 114, a pump cylinder 116, a gear assembly having a drive gear 118 and an idler gear 120, an annular magnet 122, a pump face 124 and a sensor 126. Further, the motor casing 102 includes holes 128 for allowing motor power wiring 130 to pass therethrough.

Figure 3:
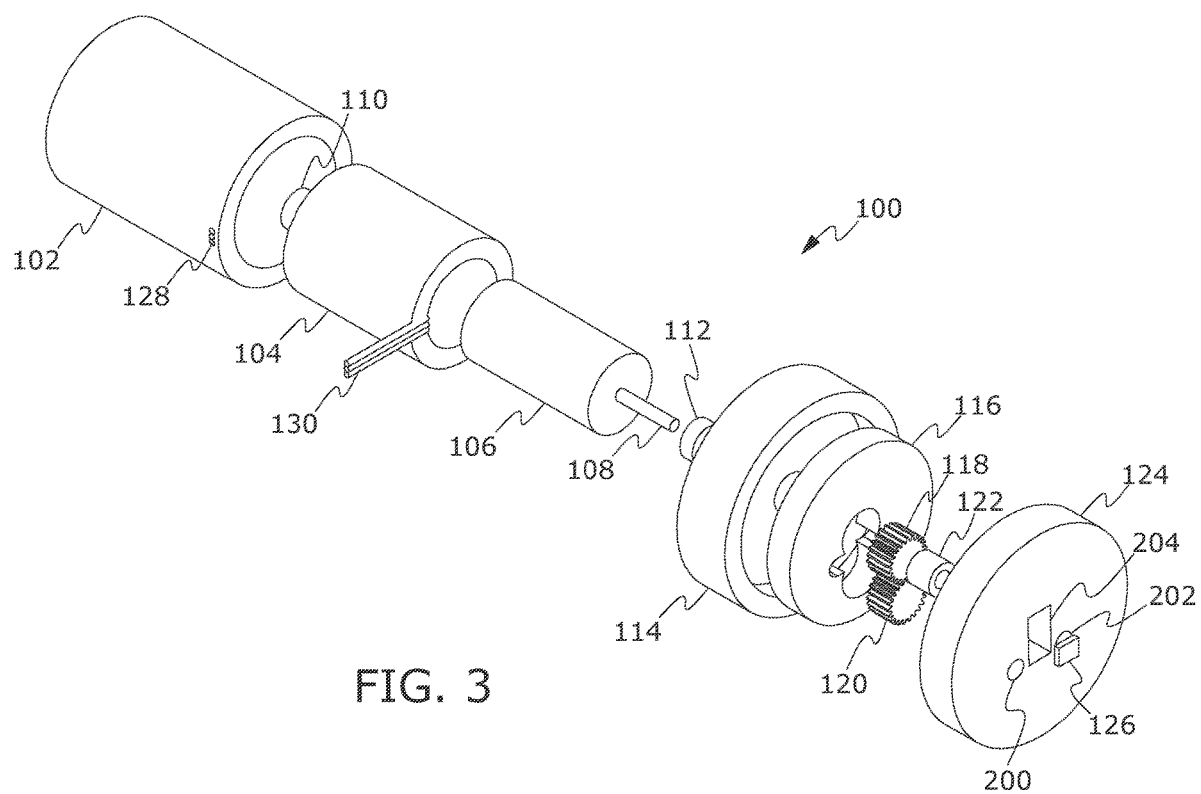
FIG. 3 is an exploded isometric view of the gear pump of FIG. 2, in accordance with an embodiment of the present disclosure.

In FIG. 3, there is illustrated an exploded isometric view of the gear pump of FIG. 1 additionally including a fluid inlet port 200 and a fluid outlet port 202 configured or arranged on the pump face 124. The pump face 124 also includes a trench 204.

Figure 4:
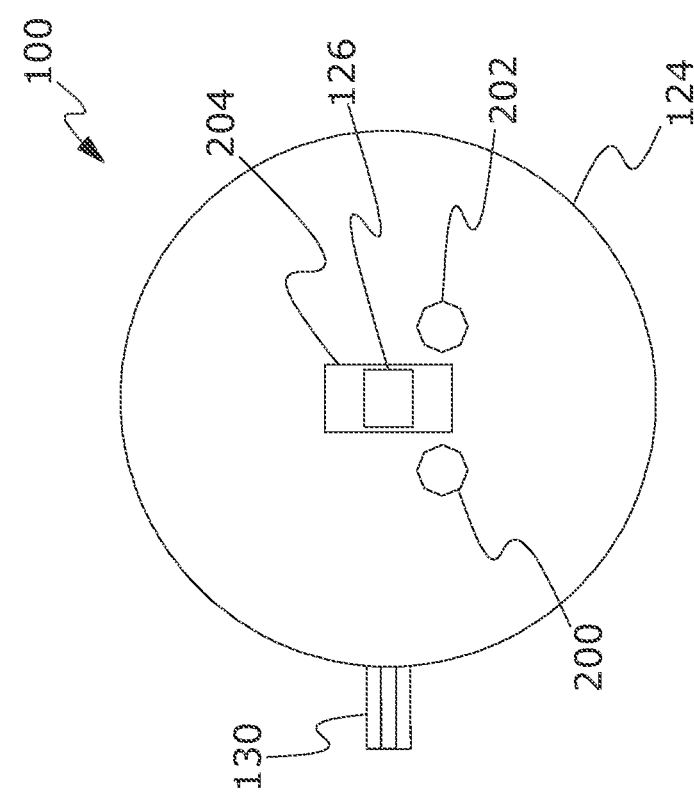
FIG. 4 is an assembled elevation view of the gear pump of FIG. 2, in accordance with an embodiment of the present disclosure.

Referring next to FIG. 4, there is shown an illustration of an assembled front elevation view of the gear pump of FIG. 1. As shown, the pump face 124 constitutes an exterior surface of a pump housing (which is formed by the pump head casing 114 and the pump face 124, shown in FIG. 2). The fluid inlet port 200 and the fluid outlet port 202 are shown with small circles on the pump face 124. The trench 204 is shown with a rectangular box between the fluid inlet port 200 and the fluid outlet port 202. The sensor 126 is disposed on the pump face 124, namely on the exterior surface of the pump housing. Specifically, the sensor 126 is disposed within the trench 204. Furthermore, the trench 204 is positioned in the pump face 124 such that the sensor 126 is disposed coaxially with the annular magnet 122 (shown in FIG. 2). In FIG. 3, there is also provided an illustration of the motor power wiring 130 extending through the motor casing 102 (shown in FIG. 2).

Figure 5:
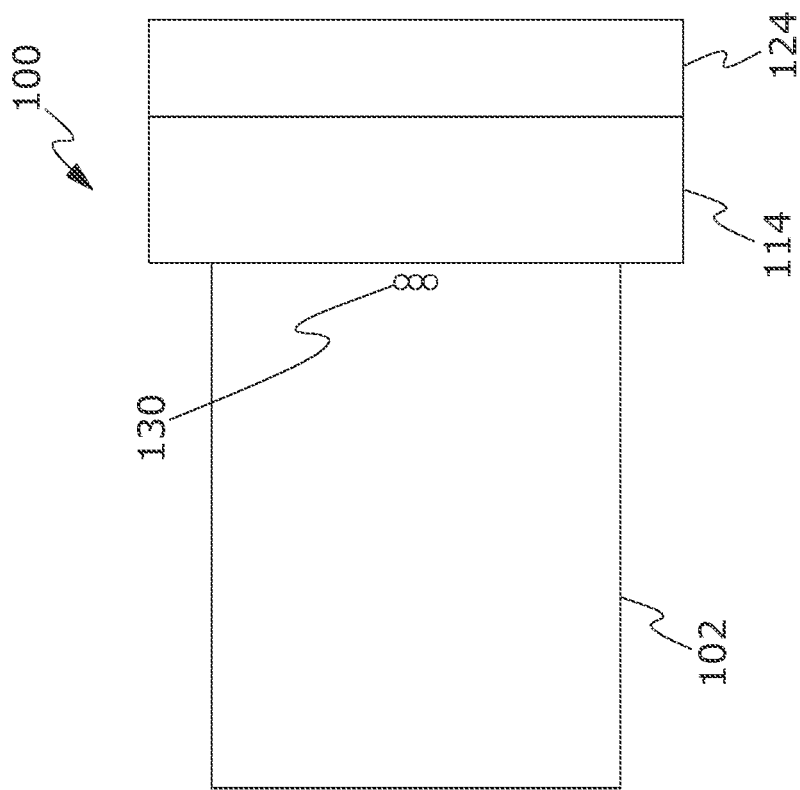
FIG. 5 is an assembled plan view of the gear pump of FIG. 2, in accordance with an embodiment of the present disclosure.

In FIG. 5, there is provided an illustration of an assembled plan view of the gear pump of FIG. 1. As shown, the motor casing 102 is coupled with the pump head casing 114. Furthermore, the pump head casing 114 is shown coupled to the pump face 124 for configuring the pump housing, which houses the pump cylinder 116, the drive gear 118, the idler gear 120 and the annular magnet 122 (shown in FIG. 2). In FIG. 4, there is also provided an illustration of the motor power wiring 130 extending through the motor casing 102.

Referring next to FIGS. 6A-C, there are shown therein illustrations of the assembled plan view of the gear pump of FIG. 1, a cross-sectional view of the assembled plan view about an axis A-A', and an enlarged view of a portion A" of the cross-sectional view, respectively. In FIG. 6A, there explicitly shown the axis A-A', vertically positioned on the pump head casing 114, along which the cross-sectional view of the gear pump 100 is shown (namely FIG. 6B).

In FIG. 6B, there is shown the pump head casing 114 and the pump cylinder 116 (using different hatch patterns), received into the pump head casing 114. Moreover, in FIG. 5B, there is also illustrated the motor power wiring 130 arranged, namely configured, to extend through the motor casing 102 (shown in FIG. 2). Furthermore, in FIG. 6B, there is shown an illustration of the circular portion A'' (shown with dotted line), enclosing various components of the gear pump 100 shown with enlarged view (namely FIG. 6C).

In FIG. 6C, there is provided an enlarged view of the components of the gear pump 100 enclosed by the circular portion A''. As shown, the pump cylinder 116 includes a channel 500 that is arranged, namely configured, to receive the drive gear 118 and the idler gear 120. The channel 500 mainly includes a circular through opening conforming to outer surfaces of the drive gear 118 and the idler gear 120 for being received therein. Furthermore, the drive gear 118 and the idler gear 120 are operable to be engaged (or meshed) with each other when received in the channel 500. Moreover, the drive gear 118 is disposed coaxially on the drive shaft 108. Specifically, the drive gear 118 encloses the annular magnet 122, which is coupled to the drive shaft 108. Therefore, the drive shaft 108 is arranged in operation, namely configured, to rotate the drive gear 118 and the annular magnet 122 mounted thereon. Furthermore, the drive gear 118 is supported within the channel 500 with the help of the drive shaft 108, whereas the idler gear 120 is merely supported within the circular through opening of the channel 500. The channel 500 also includes side opening 502, 504 on either sides of the channel 500. The side openings 502, 504 of the channel 500 are in line with the fluid inlet port 200 and the fluid outlet port 202, respectively, (shown in FIG. 2). A substrate or fluid enters into and leaves from the channel 500 through the side opening 502, 504, respectively.

In FIGS. 7A-C, there are provided illustrations of the assembled elevation view of the gear pump of FIG. 1, a cross-sectional view of the assembled elevation view about an axis B-B', and an enlarged view of a portion B'' of the cross-sectional view, respectively. In FIG. 7A, there is explicitly shown the axis B-B', vertically and centrally positioned on the pump face 124, along which the cross-sectional view of the gear pump 100 is shown (namely FIG. 7B).

In FIG. 7B, there is shown the motor casing 102 coupled to the pump head casing 114 for enclosing the motor stator 104 and the motor rotor 106 therein. The pump head casing 114 is further coupled to the pump face 124 for enclosing the pump cylinder 116 along with other components, which will be explained in detail in conjunction with FIG. 7C. Moreover, in FIG. 7B, there is also illustrated the rear bearing 110, wherein the front bearing 112 is coaxially attached onto end portions of the drive shaft 108, particularly the rear bearing 110 is received in a cut-out provided on the motor casing 102 and the front bearing 112 is received in a through opening provided in the pump head casing 114.

In FIG. 7C, there is shown an enlarged view of the components of the gear pump 100 enclosed by the circular portion B''. As shown, an end portion 602 of the drive shaft 108 extends from the motor rotor 106. Furthermore, the end portion 602 of the drive shaft 108 passes through the front bearing 112 (received in a through opening 604 provided in the pump head casing 114). The end portion 602 of the drive shaft 108 is further coupled to the annular magnet 122, which is surrounded by the drive gear 118. The drive gear 118 is further shown engaged to the idler gear 120, received within the channel 500 of the pump cylinder 116. In FIG. 6C, there is also illustrated the trench 204 arranged, namely configured, on the pump face 124. The trench 204 accommodates the sensor 126 therein. As shown, the trench 204 extends from an outer surface 610 to an inner surface 612 of the pump face 124 such that when the sensor 126 is positioned inside the trench 204, the sensor 126 is positioned in proximity to the annular magnet 122. This allows the sensor 126 to sense efficiently rotation of the annular magnet 122 and to generate an output signal corresponding to a rotational position of the drive shaft 108.

Figure 8A:
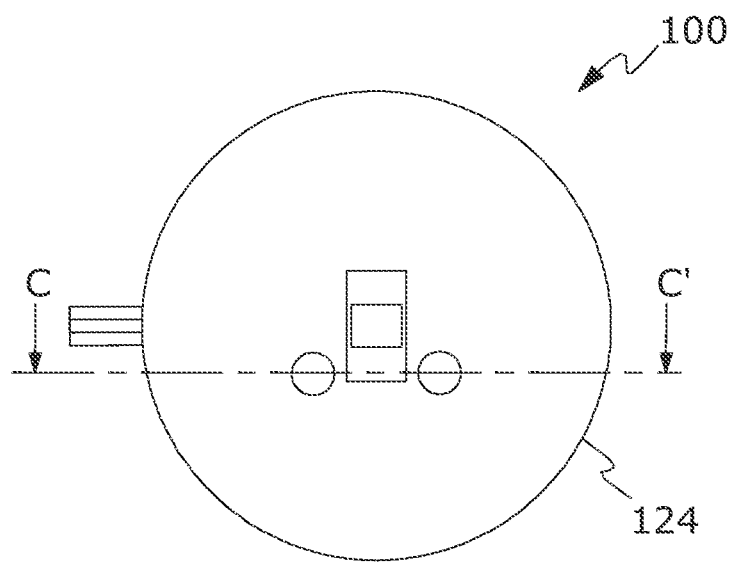
FIGS. 8A-B are the assembled elevation view of the gear pump and a cross-sectional view of the assembled elevation view about an axis C-C', respectively, in accordance with an embodiment of the present disclosure.
Figure 8B:
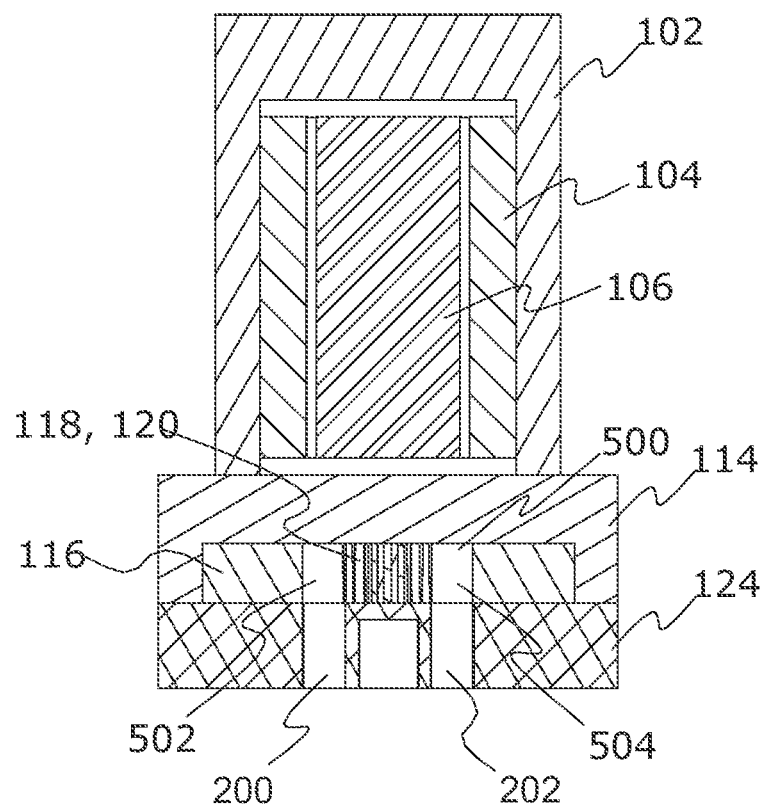

In FIGS. 8A-B, there are provided illustrations of the assembled elevation view of the gear pump of FIG. 1 and a cross-sectional view of the assembled elevation view about an axis C-C', respectively. Moreover, in FIG. 8A, there is explicitly shown the axis C-C', horizontally and non-centrally positioned on the pump face 124, along which the cross-sectional view of the gear pump 100 is shown (namely FIG. 8B).

In FIG. 8B, there is shown the motor casing 102 coupled to the pump head casing 114, enclosing the motor stator 104 and the motor rotor 106. The pump head casing 114 is further coupled to the pump face 124 for enclosing the pump cylinder 116 and the drive and idler gears 118, 120. The drive and idler gears 118, 120 are received in the channel 500 of the pump cylinder 116. FIG. 8B essentially shows a fluidic coupling between the channel 500 and the fluid inlet port 200 and the fluid outlet port 202 present in the pump face 124. As shown, the side opening 502, 504 (present on either sides of the channel 500) are in line with the fluid inlet port 200 and the fluid outlet port 202, respectively. Therefore, the substrate enters into and leaves from the channel 500 through the fluid inlet port 200 and the fluid outlet port 202, respectively.

Figure 9A:
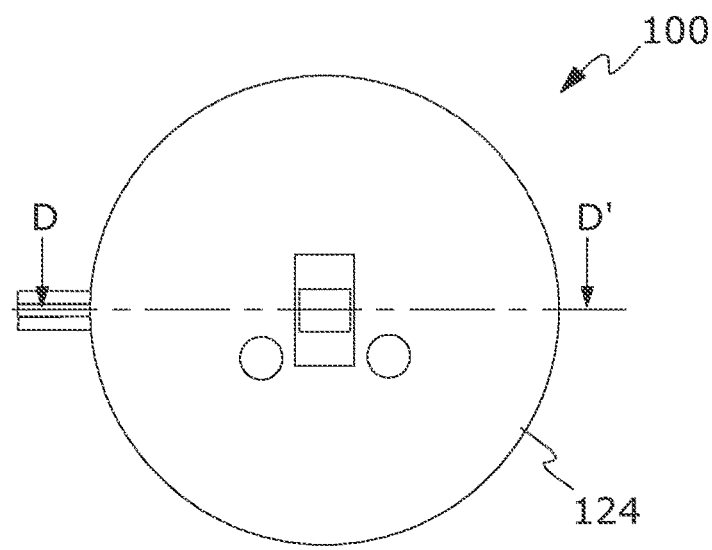
FIGS. 9A-B are the assembled elevation view of the gear pump and a cross-sectional view of the assembled elevation view about an axis D-D', respectively, in accordance with an embodiment of the present disclosure.
Figure 9B:
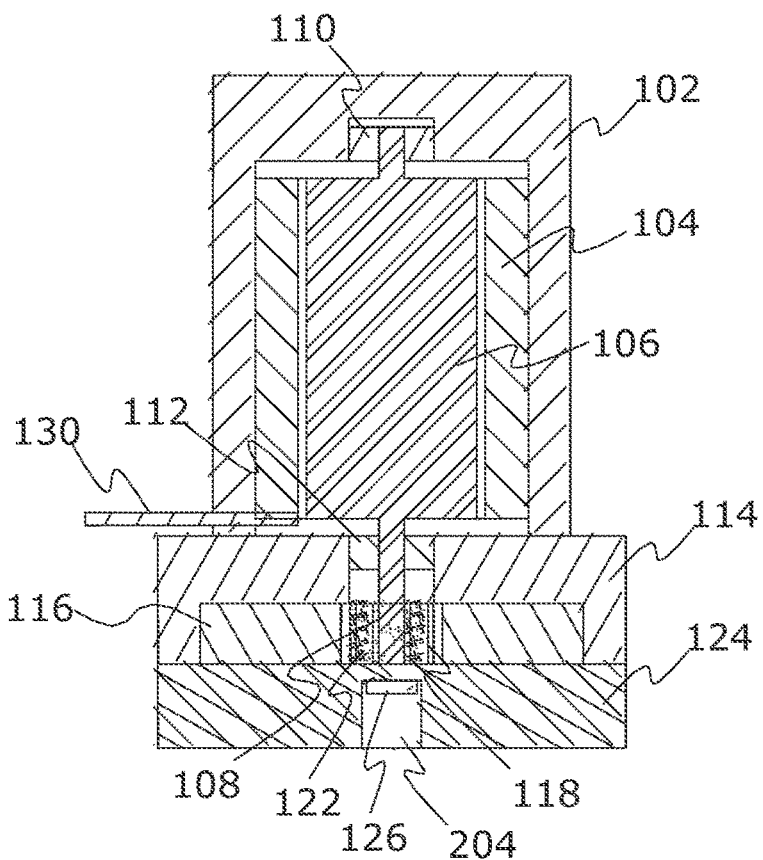

In FIGS. 9A-B, there are provided illustrations of the assembled elevation view of the gear pump of FIG. 1 and a cross-sectional view of the assembled elevation view about an axis D-D', respectively. FIG. 9A explicitly shows the axis D-D', horizontally and centrally positioned on the pump face 124, along which the cross-sectional view of the gear pump 100 is shown (namely FIG. 9B).

In FIG. 9B, there is also shown the motor casing 102 coupled to the pump head casing 114, and enclosing the motor stator 104 and the motor rotor 106 therein. The pump head casing 114 is further coupled to the pump face 124 for enclosing the pump cylinder 116 therein. Moreover, in FIG. 7B, there is also further illustrated the rear bearing 110 and the front bearing 112 coaxially attached to the end portions of the drive shaft 108. Furthermore, in FIG. 7B, there is also illustrated the annular magnet 122 mounted on the end portion of the drive shaft 108, and the annular magnet 122 is enclosed by the drive gear 118. Yet additionally, in FIG. 7B, there is provided an illustration of the trench 204 accommodating the sensor 126, and the motor power wiring 130 coupled the motor stator 104 and extending through the motor casing 102.

When in operation, the aforesaid gear pump 10, 100 is required to dispense accurately defined quantities of fluid at its outlet. Controlling the gear pump 10, 100 is a non-trivial task, because:

(i) temporal transport delays of the fluid passing through the gear pump 10, 100 occur during operation; and (ii) elastic flexures of component parts of the gear pump 10, 100 also occur that contribute to potential inaccuracies exhibited by the gear pump 10, 100 during operation.

Figure 10:
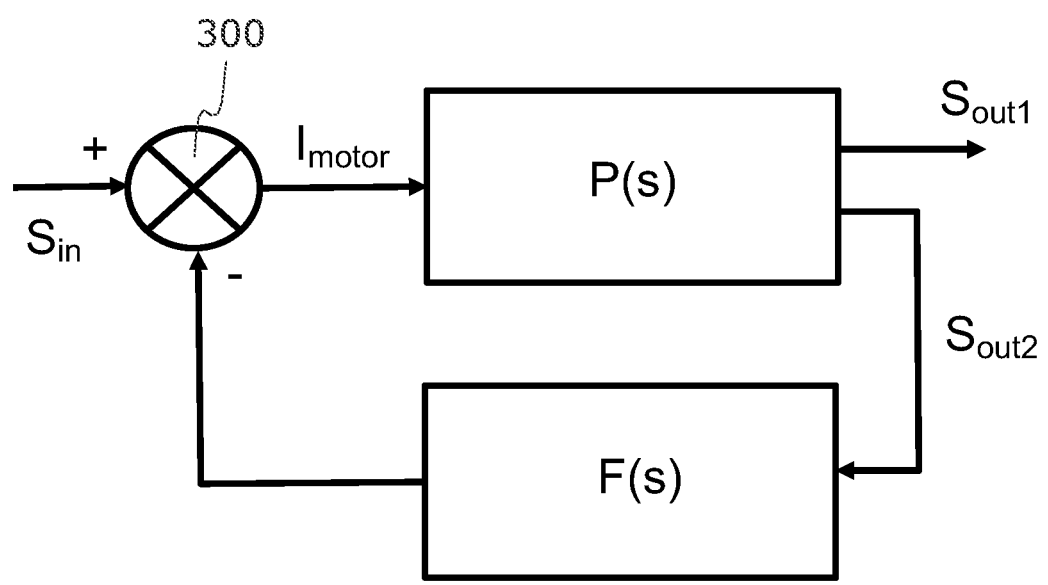
FIG. 10 is an illustration of a conventional feedback loop for use in a controller that controls an operation of the gear pump when pumping fluids.

As illustrated in FIG. 10, the controller that is used to control the gear pump 10, 100 receives the aforesaid sensor signal denoted by $S_{out2}$ that is indicative of at least one of: a rotation rate of the drive shaft, a rotation rate a driven gear coupled to the drive shaft, and a rotation rate of an idler gear that cooperates with the driven gear to provide a pumping effect, a pressure difference. In FIG. 10, a pumping function of the gear pump 10, 100 is denoted by a transfer function P(s), wherein "s" is a complex frequency operator, namely jωt. A comparator 300 in FIG. 10 is used to provide negative feedback. An input signal $S_{in}$ is used to define a rate of fluid dispensing $S_{out1}$ that is required to be delivered from the outlet of the gear pump 10, 100. A feedback function F(s) is used to define a desired close-loop operating characteristic of the gear pump 10, 100; the function F(s) is beneficial a form of PID function, as described in the foregoing To avoid a need to include a flow meter at the inlet or outlet of the pump 10, 100, or both, it is assumed for a given fluid viscosity that the sensed rotation rate of the drive shaft $S_{out2}$, for example, is closely related by a relationship H(s) to a rate $S_{out1}$ of fluid flow at the outlet of the gear pump 10, 100; for example, such a relationship H(s) is assumed to be linear or a low-order polynomial. Moreover, the relationship H(s) can be determined from open-loop characterization or calibration of the gear pump 10, 100. The relationship H(s) is described by Equation 2 (Eq. 2):

$$S_{out1} = H(s) S_{out2} \qquad \text{Eq. 2}$$

An overall closed-loop transfer function for the gear pump is then given by Equation 3 (Eq. 3):

$$\frac{S_{out1}}{S_{in}} = \frac{P(s)}{[1 + F(s)P(s)]H(s)} \qquad \text{Eq. 3}$$

As the transfer function P(s) becomes large in magnitude, a closed-loop pumping characteristics of the gear pump 10, 100 is mostly defined by the feedback function F(s) and by the relationship H(s). However, in an event that the right-hand-side denominator of Equation 3 (Eq. 3) approaches zero in value or becomes a predominantly complex value, there can potentially arise overshoot, oscillations and dynamic instabilities in operation of the gear pump 10, 100. In particular, transport delays occurring within the gear pump 10, 100 can be represented as a series of frequency response poles of an order greater than 2 that can cause the right-hand-side denominator of Equation 3 (Eq. 3) to approach a zero value at certain frequencies at which oscillation could potentially occur, resulting in erratic or unstable gear pump operation.

As aforementioned, it is desirable in respect of the gear pump 10, 100 to avoid a need for a flow meter that can be costly and difficult to keep clean if the fluid being pumped by the gear pump has a tendency to precipitate solid materials onto surfaces within the gear pump 10, 100; for example, the fluid is an emulsion that must be kept in motion to avoid settling and coagulation. The controller is thus configured to implement the feedback function F(s), wherein the controller receives the signal $S_{in}$ and dynamically adjusts a voltage drive $V_{motor}$ or a current drive $I_{motor}$ to the motor of the gear pump 10, 100 to achieve a desired fluid pumping rate $S_{out1}$ at the outlet of the gear pump 10, 100.

Figure 11:
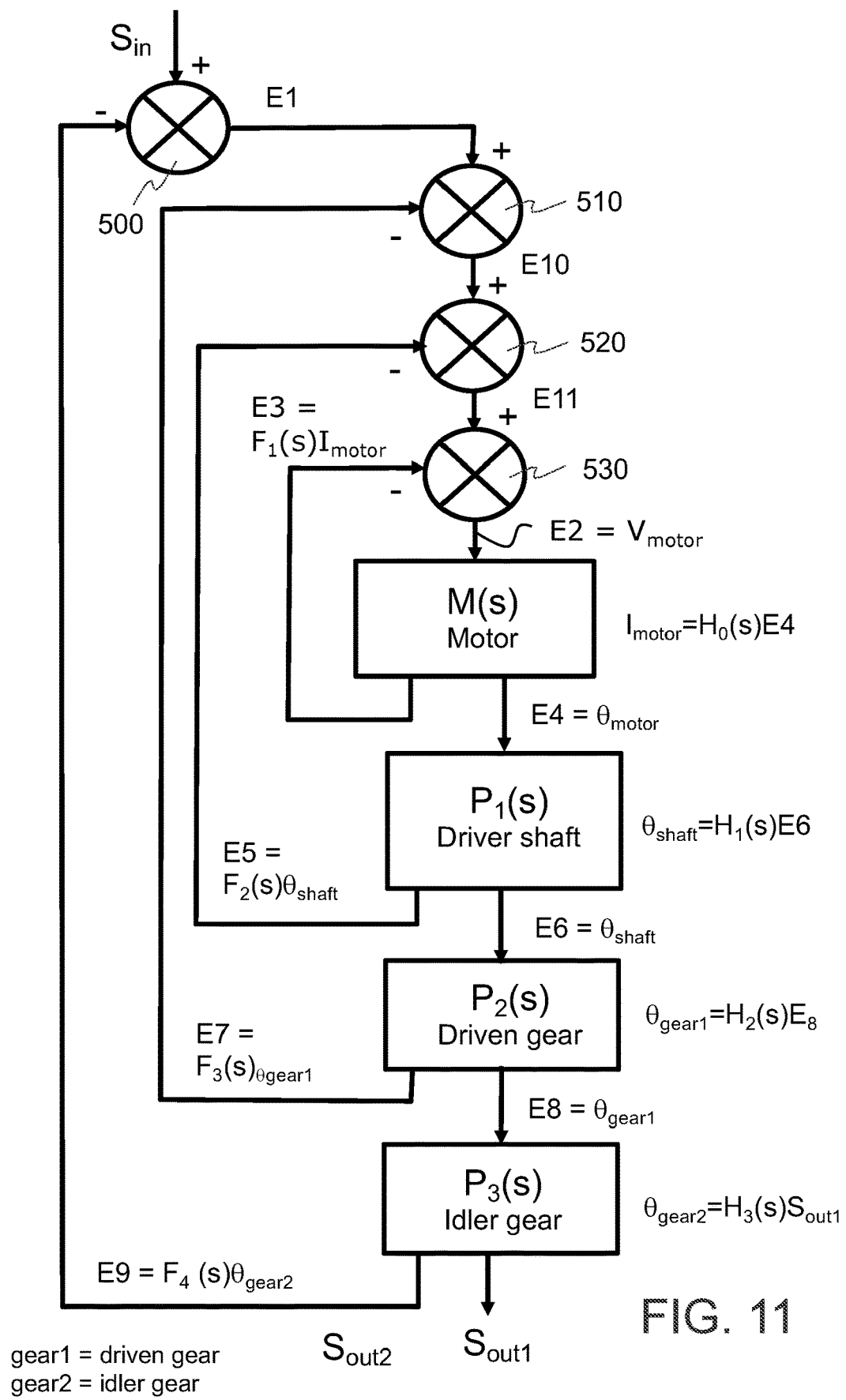
FIG. 11 is an illustration of a nested feedback loop for use in a controller of the gear pump for ensuring more reliable and accurate operation of the gear pump when pumping fluids.

An operation of the gear pump 10, 100 can be enhanced by employing a nested form of feedback control as depicted in FIG. 11. By using a nested feedback control, a greater pumping accuracy is attainable without encountering aforementioned problems of potential overshoot, oscillations and dynamic instabilities. In FIG. 11, an open-loop transfer function of the motor is denoted by M(s), wherein an excitation voltage applied by the controller to the motor is denoted by $V_{motor}$, and a current flowing through windings of the motor is denoted by $I_{motor}$. In FIG. 11, a transfer function denoting flexure of the drive shaft is denoted by $P_1(s)$. Moreover, in FIG. 11, a transfer function denoting a flexure of the driven gear is denoted by $P_2(s)$. Furthermore, in FIG. 11, a transfer function denoting viscous following and potential chatter of the idler gear is denoted by $P_3(s)$. Additionally, in FIG. 11, inner nested feedback loops are denoted by feedback functions $F_1(s)$ to $F_3(s)$, and an outer nested feedback loop is denoted by a feedback function $F_4(s)$. Whereas the feedback function $F_4(s)$ controls an overall closed-loop operating characteristic for the gear pump 10, 100, the feedback functions $F_1(s)$ to $F_3(s)$ assist to improve dynamic stability of the gear pump 10, 100 under temporally-changing operating conditions to provide an enhanced pump performance under dynamic conditions. The feedback control of FIG. 11 includes four comparators 500 to 530 for the outer and inner nested feedback loops to provide a hybrid form of negative feedback. The gear pump 10, 100, when in operation, pumps fluid at a rate $S_{out1}$. The outer feedback loop denoted by $F_4(s)$ is coupled to an output $S_{out2}$ that is representative of a rotation rate of the idler gear, whereas the inner feedback loops is coupled to various sensed outputs that are representative of a current $I_{motor}$ applied to the motor of the gear pump 10, 100, a rotation rate of the drive shaft of the gear pump 10, 100, and a rotation rate of the driven gear of the gear pump 10, 100; optionally, an additional feedback loop is included for a sensed pressure gradient occurring in operation within the pump 10, 100, for example by sensing a pressure difference between the inlet and the outlet of the gear pump 10, 100. As, aforementioned, the outer nested feedback loop denoted by the feedback function $F_4(s)$ is primarily responsible for ensuring a generally accurate dispensing rate $S_{out1}$ from the gear pump 10, 100 based on the rotation rate of the idler gear; the outer nested feedback loop can have a temporally slow response, for example dominated by a single pole in the response of the function $F_4(s)$. Optionally, therefore, the controller of the gear pump 10, 100 includes a plurality of nested feedback loops; for example, three nested feedback loops $F_1(s)$ to $F_3(s)$ are contained within an overall feedback loop $F_4(s)$ in FIG. 11, although fewer or more nested feedback loops are optionally employed; for example, the nested feedback loops can be based on measured feedback parameters including one or more of: component rotation rate, component rotation angle, motor current, motor voltage excitation, pressure difference, vibration, temperature gradient, temperature.

Beneficially, the feedback functions $F_1(s)$ to $F_4(s)$ are based on a PID function of Equation 1 (Eq. 1), such that the coefficients A can be adjusted individually for each of the feedback functions; for example, FIG. 11 configuration would have twelve coefficients, namely three coefficients A for each of the four feedback functions F. Optionally, to further refine operation of the gear pumps 10, 100, the coefficients A of the functions F can be made dynamically variable, depending on an operating regime of the gear pump 10, 100, for example as a function of a nature of the substrate to be pumped (for example its viscosity), or a general particular flow rate that the gear pump 10, 100 is expected to provide, or an operating temperature of the gear pump 10, 100, or any combination thereof. By dynamically modifying the coefficients A of the feedback functions F, there is achieved a greater operating stability and a more optimized dynamic performance of the gear pumps 10, 100. Optionally, the coefficients A of the feedback functions F can be progressively changed depending on a general operating regime of the gear pump 10, 100, for example high-flow conditions in contradistinction to low-flow conditions, or high-pressure operating conditions in contradistinction to low-pressure conditions developed between the input and outlet of the gear pump 10, 100. For example, when the gear pump 10, 100 is pumping fluid at a higher rate, its component parts will be rotating faster resulting in reduced transport delay for fluid through the gear pump 10, 100; conversely, when the gear pump 10, 100 is pumping at a lower rate, its component parts will be rotating slower resulting in increased transport delay for fluid through the gear pump 10, 100; differential coefficients for the at least one PID feedback function F need to be relatively smaller for the higher rate, and relatively larger for the lower rate to ensure that the gear pump 10, 100 functions well for both the higher rate and the lower rate in an adaptive manner.

In this respect, the controller of the gear pump 10, 100 can beneficially therefor use adaptive feedback; optionally, the adaptive feedback is controlled using machine learning (ML) or artificial intelligence (AI), for example for adaptively customizing each gear pump 10, 100, optionally including adapting the feedback functions to compensate for wear-and-tear and other ageing effects occurring in the gear pumps 10, 100. Adaptation of the coefficients of the feedback functions F can be made using a trained neural network computing engine that is trained on experimental data obtained from examples of the gear pump 10, 100 that have been operated under various conditions until they have become worn out.

As described in the foregoing, a PID controller can be used for implementing the functions $F_n(s)$, wherein n is an integer, and wherein n>1 corresponds to a nested feedback loop configuration. "PID" is an abbreviation for "proportional, integral, differential", as is known in the art of feedback control. The inner nested feedback loops $F_1(s)$ to $F_3(s)$ in FIG. 11 are primarily responsible for ensuring a dynamically stable pumping rate to compensate for pulsations or short-term variations in dispensing rate by way of monitoring a rotation rate of the driven gear ("gear1") or the idler gear ("gear2"), or both. The inner nested feedback loops based on the feedback functions $F_1(s)$ to $F_3(s)$ beneficially have a much faster temporal responses than the outer feedback loop based on the feedback function $F_4(s)$. Beneficially, the first, second and third feedback loops based on the feedback functions $F_1(s)$ to $F_3(s)$ respectively each have a relatively low gain to ensure that a high degree of operating stability is achieved in comparison to the overall feedback loop based on the feedback function $F_4(s)$; for example, products of $M(s)F_1(s)$, $P_1(s)F_2(s)$, and $P_2(s)F_3(s)$ are an order of magnitude smaller than a product $M(s)P_1(s)P_2(s)P_3(s)F_4(s)$. It will be appreciated that the feedback functions F(s), and the transfer functions M(s) and P(s) are conveniently expressed as low-order polynomial relationships, mutatis mutandis the feedback functions F(s). However, when transport delay of the substrate through the gear pump 10, 100 is encountered, the transfers functions P(s) can become high-order polynomials.

For the nested form of feedback loop of FIG. 11, an overall closed-loop function is provided by Equation 4 (Eq. 4):

$$\frac{S_{out1}}{S_{in}} = \frac{M'(s)P'_1(s)P'_2(s)P_3(s)}{H_3(s)[1 + F_4(s)M'(s)P'_1(s)P'_2(s)P_3(s)]} \quad \text{Eq. 4}$$

wherein $$M'(s) = \frac{M(s)}{[1 + F_1(s)M(s)]H_0(s)} \quad \text{Eq. 5}$$

-continued $$P'_1(s) = \frac{M'(s)P_1(s)}{[1 + F_2(s)P_1(s)M'(s)]H_1(s)} \quad \text{Eq. 6}$$

$$P'_2(s) = \frac{M'(s)P'_1(s)P_2(s)}{[1 + F_3(s)P_2(s)P_1(s)M'(s)]H_2(s)} \quad \text{Eq. 7}$$

and wherein $H_0(s)$, $H_1(s)$, $H_2(s)$ and $H_3(s)$ are transfer functions as defined in FIG. 11, wherein $\theta_{gear1}$, $\theta_{gear2}$ and $\theta_{shaft}$ are angles or rotation rates of the driven gear, the idler gear and the drive shaft respectively, and wherein E1 to E11 are intermediate error signals.

There are more components in the right-hand-side denominator of Equation 4 (Eq. 4) than that of Equation 3 (Eq. 3), such that the coefficients A of the functions $F_1(s)$ to $F_4(s)$ can be judiciously chosen to avoid the denominator in Equation 4 (Eq. 4) becoming predominantly complex or zero in value as a function of angular frequency $\omega$, wherein $s=j\omega t$. Thus, by employing nested feedback loops as depicted in FIG. 11, it is synergistically feasible to achieve both a higher operating stability and improved accurate dispensing control using the gear pump 10, 100 under various operating conditions. As aforementioned, one or more of the feedback functions $F1(s)$ to $F3(s)$ are beneficially made adaptive, for example as aforementioned, so that their respective coefficients A are adaptively changed depending on operating conditions for the gear pumps 10, 100, so that the coefficients A are always optimized for various operating conditions that the gear pumps 10, 100 encounter.

When the gear pumps 10, 100 include one or more vibration sensors, for example Silicon micromachined accelerometers, Fourier spectral analysis of signals from the one or more vibration sensors, for example a single vibration sensor, is beneficially performed by determining Fourier spectral components of the signals, wherein a machine learning (ML) algorithm or an artificial intelligence (AI) engine is used to determine patterns or temporal variations in amplitudes of Fourier spectral components indicative of potential operating stress or potential failure of the gear pumps 10, 100 and send suitable warnings to an operator of the gear pumps 10, 100. Such warnings, for example, beneficially trigger maintenance operations or replacement operation to be implemented in respect of the gear pumps 10, 100.

Figure 12:
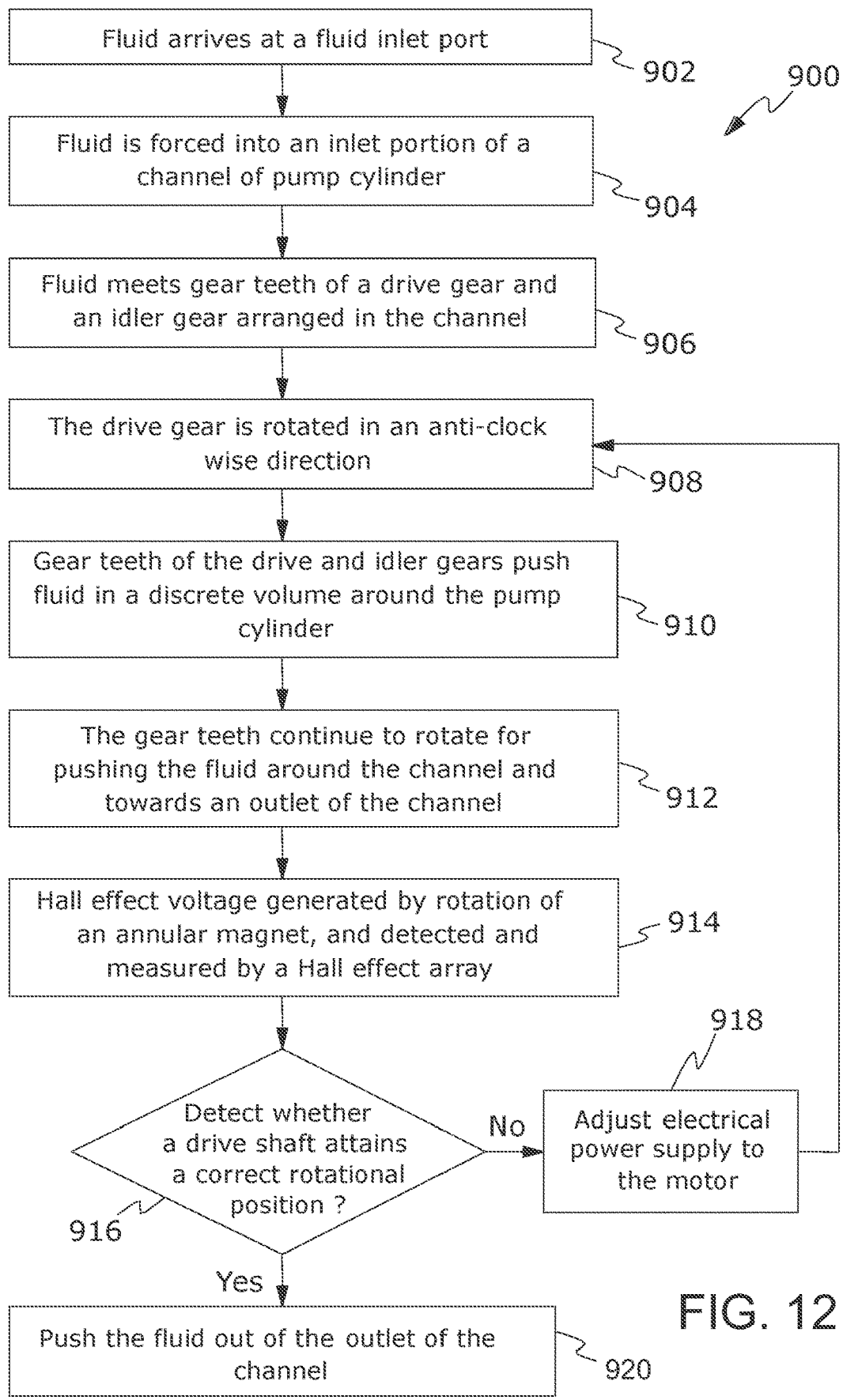
FIG. 12 is an illustration of a flow chart depicting steps of operation of the gear pump, in accordance with an embodiment of the present disclosure.

Referring now to FIG. 12, there is shown an illustration of a flow chart 900 depicting steps of a method of operating a gear pump, such as the gear pump 100, for pumping fluid, in accordance with an embodiment of the present disclosure. Primarily, a method of operating the gear pump for pumping fluid includes following steps, namely:

(i) driving a motor of the pump for rotating a drive shaft to pull the fluid towards an inlet of a channel of a pump cylinder;

(ii) rotating a drive gear and an idler gear by the drive shaft to push the fluid from the inlet towards an outlet of the channel;

(iii) generating a Hall Effect voltage by a Hall Effect array in response to rotation of an annular magnet disposed coaxially with the drive shaft;

(iv) calculating a rotational position of the drive shaft by a controller based upon the Hall Effect voltage; and (v) controlling the motor based upon the calculated rotational position or rotational rate to ensure that an accurate volume of the fluid is pumped out of the outlet of the channel. However, in the flow chart 900 of FIG. 12, there is depicted the operational steps of the gear pump in greater detail.

At a step 902, the fluid or substrate arrives at the fluid inlet port 200 of the pump face 124, which may be from a reservoir.

At a step 904, the fluid is forced into an inlet portion (namely the side opening 502) of the channel 500 of the pump cylinder 116 from the fluid inlet port 200.

At a step 906, the fluid meets the gear teeth of both the drive gear 118 and the idler gear 120, arranged inside the channel 500 of the pump cylinder 116.

At a step 908, the drive gear 118 (mounted on the end portion, of the drive shaft 108, which protrudes beyond the front bearing 112) is rotated in an anti-clock wise direction. For example, an electrical power (of about 24 volts) is supplied to the motor, particularly to the motor stator 104 for generating a magnetic field, which influences the motor rotor 106 to attain a rotary motion and in-turn rotate the drive shaft 108. The rotation of the drive gear 118 further rotates the idler gear 120 in a clockwise direction. Therefore, the fluid is forced into the side opening 502 of the channel 500 due to a suction pressure zone generated at the fluid inlet port 200 by the rotation of the drive and idler gears 118, 120 within the channel 500.

At a step 910, gear teeth of the drive and idler gears 118, 120 push fluid in a discrete volume around the pump cylinder. Specifically, the gear teeth of the drive and idler gears 118, 120 are enclosed by the channel 500 of the pump cylinder 116, therefore, a discrete enclosed volume is formed by spaces between each of the gear teeth and the pump cylinder 116. Furthermore, uniform construction of the drive and idler gears 118, 120, and smoothness of the channel 500 ensure that each of these discrete enclosed volumes is exactly the same, and to within a manufacturing tolerance. Therefore, each complete rotation of the drive and idler gears 118, 120 delivers exactly a same volume of the fluid, under constant pressure and consistent fluid characteristics. Accordingly, this uniform behaviour when allied with a precise rotational control of the drive shaft 108 allows the gear pump 100 to pump an accurate volume of the fluid.

At a step 912, the gear teeth continue to rotate for pushing the fluid around the channel 500 and towards an outlet (namely the side opening 504) of the channel 500. Specifically, the fluid is forced into the side opening 504 of the channel 500 due to an ejection pressure zone generated at the fluid outlet port 202 by the rotation of the drive and idler gears 118, 120 within the channel 500. Furthermore, as the drive and idler gears 118, 120 are rotated continuously by the drive shaft 108; therefore each rotation pushes the same volume of the fluid around and towards the outlet of the channel 500.

At a step 914, there is detected the Hall Effect voltage generated by rotation of the annular magnet 122, and detected and measured by the Hall Effect array comprised within sensor 126. The Hall Effect voltage (or fluctuation) of the magnetic field is generated due to the rotation of the annular magnet 122, which is rotated by the drive shaft 108. Furthermore, the generated Hall Effect voltage is detected and measured by the Hall Effect array comprised within the sensor 126, which is arranged on the trench 204 and positioned close to the annular magnet 122.

At a step 916, there is detected whether or not the drive shaft 108 attains a correct rotational position, as calculated by a controller based upon the Hall Effect voltage measured by the Hall Effect array. The controller is optionally a servo-controller, or separate from the servo-controller, such as a monolithic electronic unit having the Hall Effect array and a microcontroller. The controller identifies a relationship between the Hall Effect voltage, and the rotational position of the drive shaft 108.

At a step 918, there is adjusted an electrical power supply that is supplied to the motor, if the drive shaft 108 does not attains the correct rotational position. Thereafter, the step 908 is followed to correct the rotational position of the drive shaft 108. Specifically, the controller controls the electrical power supply to the motor based upon the calculated rotational position to ensure that an accurate volume of fluid is pumped. For example, the Hall Effect sensor array voltage signal is fed to the servo-controller, which compares the implied rotational position of the drive shaft 108 which is derived from the voltage signal, and alters the power delivered to the motor so as to attain the correct rotational position of the drive shaft 108 and to pump or dispense correct volume of the fluid.

At a step 920, the fluid is pushed out of the outlet of the channel 500, if the drive shaft 108 attains the correct rotational position. Specifically, the fluid is pushed towards the fluid outlet port 202 from the outlet of the channel 500 for dispensing the accurate volume of the fluid. Thereafter, again monitoring and correcting of the rotational position of the drive shaft 108 for subsequent operational cycle of the gear pump 100, based on the steps 902 to 918 is much appreciated.

The present disclosure provides a gear pump that enables pumping of an accurate volume of the fluid by measuring and controlling the rotational position of the drive shaft. Furthermore, the design and manufacturing of the gear pump avoids the need for providing a mechanical (dynamic) seal between the fluid and the sensor (or encoder), or a magnetic coupling between the motor and the pump rotors (i.e. gears), thereby reducing overall complexity and cost of manufacturing of the gear pump. Additionally, the disclosed gear pump enables isolation of the sensor from the fluid, thereby allowing it to function more efficiently and accurately.

The present disclosure provides a gear pump that enables pumping of an accurate volume of the fluid, for example a liquid, gas, foam, emulsion, suspension, gel or similar, by measuring and controlling the rotational position of the drive shaft. Furthermore, the design and manufacturing of the gear pump avoids a need for providing a mechanical sealing between the fluid and the sensor (or encoder), thereby reducing overall complexity and cost of manufacturing of the gear pump. Additionally, the disclosed gear pump enables isolation of the sensor from the fluid, thereby allowing it to function more efficiently and accurately. The gear pump of the present disclosure does not need to include mechanical seals, and therefore, potentially requires less maintenance. Consequently, Mean Time Between Failure (or MTBF) for the gear pump and automatic failure detection for all common failure modes is enhanced, namely higher. A lack of mechanical seals also improves efficiency of the gear pump due to elimination of friction losses. Furthermore, the gear pump has a simple design, increased potential for miniaturisability, and a good price-to-performance ratio. Moreover, the gear pump is capable of operating in harsh, hostile, or hazardous ambient conditions due to lack of environmentally exposed sensitive or moving parts. Additionally, failure of the gear pump is unlikely to result in leakage between the substrate and the environment, since failure-prone parts thereof are contained entirely in the statically sealed pump housing. Therefore, the gear pump described in the present disclosure has reduced substrate contamination from environment, even when operating under negative pressure (substrate to ambient) or vacuum. The gear pump also has reduced environmental contamination with substrate, even when operating under positive pressure (substrate to ambient). Furthermore, for low temperature processes, the substrate cools the pump motor. The gear pump is optionally implemented in a fully passive (semiconductor free) and fixed magnet free environment, for extreme high temperature tolerance or ionising radiation tolerance. Additionally, the gear pump of the present disclosure provides extra process control information without use of additional sensors. Moreover, deviations from normal values such as improper pump functionality, or substrate pressure across pump, are highlighted during use of the pump. For example, variations in torque to speed ratio or speed over a period of time is indicative of health of the pump (such as broken pump drive shaft, missing tooth on pump gear, worn pump gears, jammed pump head, worn pump cylinder, overpressure, blockage, and so forth) and process conditions (such as lumpy substrate, thin or thick substrate, gas in a liquid substrate, small hard particulates, and so forth).

It will be appreciated from the foregoing that the gear pump is conveniently controlled by monitoring an angular position of the drive shaft. However, after a prolonged period of operation, wear can occur in the gear pump that results in backlash. To address such backlash, it is beneficial that any idler gears of the gear pump are subjected to viscous drag forces, for example generated electromagnetically via eddy current induction, so that they always follow motion of driven gears. However, it will be appreciated that enhanced accuracy of the gear pump is achieved by measuring angular positions of its gear wheels rather than, or in addition to, the drive shaft. However, measuring the angular positions of the driven and idler gears is very difficult to achieve optically, especially when the substrate is optically opaque. For such reason, the gear pump beneficially employs the aforementioned magnetic sensors and/or the aforementioned electrostatic sensor (namely variable capacitance sensor) and/or the aforementioned magnetic inductive sensor because such sensors are less adversely influenced by optical properties of the substrate.

When both angular positions of the drive shaft and one or more of the drive and idler gears are sensed for controlling pumping of the gear pump when in operation, mutually different servo loops are employed, for example in a nested configuration, for example as aforementioned with reference to FIG. 12, for the drive shaft and the gears. Thus, as aforementioned, one of the servo loops is involved with correcting for backlash and flexure in the drive shaft, whereas another of the servo loops is involved with controlling a majority of rotation provided by the motor when in operation; examples of such servo loops are shown in FIG. 11. The servo loop for coping with backlash is beneficially a PID control algorithm, for example as aforementioned with reference to Equation 1 (Eq. 1), that is specifically adjusted for coping with transport delay that is equivalent, in effect, to backlash in its temporal characteristics.

REFERENCE KEY FOR THE PARTS SHOWN IN THE DRAWINGS

The following list provides a key to the part numbers used in the figures and their foregoing description. The same part number may be referred to in different embodiments of the invention and will be prefaced by a number indicating the number of the embodiment.

10—device
20—motor
30—pump module
40—sensor target
50—sensor
60—pump housing
62—exterior surface
70—fluid inlet port
72—fluid outlet port
80—controller
100—gear pump
102—motor casing
104—motor stator
106—motor rotor
108—drive shaft
110—rear bearing
112—front bearing
114—pump head casing
116—pump cylinder
118—drive gear
120—idler gear
122—annular magnet
124—pump face
126—sensor
128—holes on the motor casing
130—motor power wiring
200—fluid inlet port
202—fluid outlet port
204—trench
500—channel
502,504—side openings of the channel
602—end portion of the drive shaft
604—through opening of the pump head casing
610—outer surface of the pump face
612—inner surface of the pump face Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. Expressions such as "one or more" and "at least one" are to be construed to relate to the singular in an example embodiment, and to relate to the plural in another example embodiment.

I claim:

1. A gear pump for pumping a fluid, wherein the gear pump comprises:
a motor for driving a rotatable drive shaft;
a drive gear that is configured to be driven by the drive shaft;
an idler gear which meshes with the drive gear;
an annular magnet arrangement disposed coaxially with the drive shaft and configured to rotate therewith;
a sensor for sensing rotation of the annular magnet arrangement and generating an output signal corresponding to a rotational position of the drive shaft; and
a controller that is configured to calculate the rotational position of the drive shaft based upon the output signal and to control the motor based upon the calculated rotational position to ensure that a controlled volume of the fluid is pumped, wherein the controller is configured to use at least one PID algorithm to control the motor, and wherein the controller is configured to use nested feedback loops to adjust an electrical current or an electrical excitation voltage supplied to the motor to ensure that the controlled volume of the fluid is pumped.

2. The gear pump of claim 1, wherein the nested feedback loops include an outer loop that is provided with an input signal that is representative of a rotation angle or a rotation rate of the rotatable drive shaft or at least one of the drive gear and the idler gear.

3. The gear pump of claim 1, wherein the controller is configured to adaptively adjust coefficients of the at least one PID algorithm in response to operating conditions of the gear pump.

4. The gear pump of claim 1, wherein the sensor comprises a Hall Effect array that is configured to generate the output signal in a form of a Hall Effect voltage in response to the rotation of the annular magnet arrangement.

5. The gear pump of claim 1, wherein the annular magnet arrangement is disposed within the drive gear.

6. The gear pump of claim 1, wherein the annular magnet arrangement is magnetised diametrically.

7. The gear pump of claim 1, further comprising a pump housing having an exterior surface.

8. The gear pump claim 7, wherein the sensor is disposed on the exterior surface of the pump housing.

9. The gear pump of claim 7, wherein the sensor is disposed on an inside region within the exterior surface of the pump housing.

10. A method of pumping a fluid using a gear pump, wherein the method comprises steps of:
   driving a motor to rotate a drive shaft, and arranging for the drive shaft to rotate one or more rotatable components of a pump module for pumping the fluid, and for rotating a sensor target associated with the drive shaft and/or the one or more rotatable components of the pump module;
   using a sensor to sense rotation of sensor target and to generate an output signal corresponding to a rotational position of the sensor target;
   calculating the rotational position or a rotation rate of the drive shaft and/or the one or more rotatable components of the pump module based upon the output signal; and
   controlling the motor based upon the calculated rotational position or rotation rate to controllably pump a volume of the fluid, wherein the controlling uses at least one PID algorithm to control the motor, and wherein the method includes configuring the controller to use nested feedback loops to adjust an electrical current or an electrical excitation voltage supplied to the motor to ensure that a controlled volume of the fluid is pumped.

11. The method of claim 10, wherein the method includes configuring the nested feedback loops to include an outer loop that is provided with an input signal that is representative of the rotational position or the rotation rate of the rotatable drive shaft or at least one of the one or more rotatable pumping components of the gear pump.

12. The method of claim 10, wherein the method includes configuring the controller to adaptively adjust coefficients of the at least one PID algorithm in response to operating conditions of the gear pump.

13. The method of claim 10, wherein the sensor target includes an annular magnet arrangement.

14. A software product including computing instructions therein that are executable by computing hardware to implement the method of claim 10.

15. A device for pumping a fluid, wherein the device comprises:
   a motor for driving a rotatable drive shaft;
   a pump module to be driven in operation by the drive shaft;
   at least one sensor target operatively associated with at least one of: the drive shaft, one or more rotatable pumping components of the pump module, or the fluid that is pumped;
   at least one sensor for sensing a change in property of the at least one sensor target (40) as the drive shaft rotates in operation, and for generating an output signal corresponding to a rotational position of at least one of: the drive shaft, or the one or more rotatable pumping components of the pump module; and
   a controller that is operable to calculate the rotational position or a rotation rate of at least one of: the drive shaft, or the one or more rotatable pumping components of the pump module, based upon the output signal and to control the motor based upon the calculated rotational position or rotation rate to ensure that a controlled volume of the fluid is pumped, wherein the controller is configured to use at least one PID algorithm to control the motor, and wherein the controller is configured to use nested feedback loops to adjust an electrical current or an electrical excitation voltage applied to the motor to ensure that a controlled volume of the fluid is pumped.

16. The device of claim 15, wherein the nested feedback loops include an outer loop that is provided with an input signal that is representative of the rotational position or the rotation rate of the rotatable drive shaft or at least one of the one or more rotatable pumping components of the pump module.

17. The device of claim 15, wherein the controller is configured to adaptively adjust coefficients of the at least one PID algorithm in response to operating conditions of the device.

18. The device of claim 15, wherein the at least one sensor is configured to measure an angular position of the drive shaft for generating the output signal, and the controller is configured calculate the rotational position of the drive shaft for use in controlling the motor to ensure that the controlled volume of fluid is pumped.

19. The device of claim 15, wherein the at least one sensor is configured to measure an angular position of a driven rotating pumping component of the pump module for generating the output signal, and the controller is configured to calculate a calculated rotational position of the driven rotating pumping component for use in controlling the motor to ensure that the controlled volume of fluid is pumped.

20. The device of claim 15, wherein the at least one sensor is configured to measure an angular position of an idling rotating pumping component of the pump module for generating the output signal, and the controller is configured to calculate a calculated rotational position of the idling rotating pumping component for use in controlling the motor to ensure that the controlled volume of fluid is pumped.

21. The device of claim 15, wherein the at least one sensor target comprises a disc that has alternate optically transparent and opaque patterns and a light source, and each corresponding sensor is a photodetector array that is configured to receive light from the optically transparent and opaque patterns to generate the output signal for use in controlling the motor to ensure that the controlled volume of fluid is pumped.

22. The device of claim 15, wherein the at least one sensor target comprises a material whose dielectric and/or conductive properties spatially varies, and each corresponding sensor includes a pair of electrodes that are configured to interact capacitively with the sensor target to generate an output signal in response to the rotation of the drive shaft causing a capacitance generated between the pair of electrodes to change.

23. The device of claim 15, wherein the at least one sensor target is fabricated from a material whose magnetic properties are spatially varying, and each corresponding sensor is configured such that its inductance changes as a function of angular position of the at least one sensor target relative to the at least one sensor, wherein the at least one sensor is configured to generate the output signal in response to the rotation of the drive shaft.

24. The device of claim 23, wherein the at least one sensor target comprises a disc having circumferential teeth, and each corresponding sensor comprises a magnet and a surrounding coil assembly configured to generate the output signal in a form of magnetic flux as the change in the property in response to the rotation of the drive shaft.

25. The device of claim 15, wherein the at least one sensor target and the at least one sensor are included within a pump housing of the device.

26. The device of claim 15, wherein the at least one sensor target is included within a pump housing of the of the device, and the corresponding at least one sensor is exterior to the pump housing of the device.

27. The device of claim 15, wherein the at least one sensor target and the at least one sensor are exterior to the pump housing of the device.

* * * * *